United States Patent

Yokoyama et al.

Patent Number: 5,818,555
Date of Patent: Oct. 6, 1998

[54] SURFACE LIGHT SOURCE DEVICE

[75] Inventors: Kazuaki Yokoyama; Tsuyoshi Ishikawa; Takayuki Arai; Tetsufumi Ohta, all of Kawaguchi, Japan

[73] Assignee: Enplas Corporation, Saitama-ken, Japan

[21] Appl. No.: 640,805

[22] PCT Filed: Nov. 2, 1994

[86] PCT No.: PCT/JP94/01849

§ 371 Date: Jun. 4, 1996

§ 102(e) Date: Jun. 4, 1996

[87] PCT Pub. No.: WO95/12827

PCT Pub. Date: May 11, 1995

[30] Foreign Application Priority Data

| Nov. 5, 1993 | [JP] | Japan | 5/63947 U |
| Feb. 10, 1994 | [JP] | Japan | 6/36329 |
| Mar. 30, 1994 | [JP] | Japan | 6/82714 |
| Mar. 30, 1994 | [JP] | Japan | 6/82752 |
| Mar. 31, 1994 | [JP] | Japan | 6/83782 |

[51] Int. Cl.[6] .............................................. G02F 1/1335
[52] U.S. Cl. .................................. 349/67; 62/63
[58] Field of Search ................ 349/61, 62, 63, 349/67

[56] References Cited

U.S. PATENT DOCUMENTS

| 5,467,208 | 11/1995 | Kokawa et al. | 349/67 |
| 5,550,657 | 8/1996 | Tanaka et al. | 349/62 |
| 5,572,411 | 11/1996 | Watai et al. | 362/31 |
| 5,584,556 | 12/1996 | Yokoyama et al. | 349/62 |
| 5,627,926 | 5/1997 | Nakamura et al. | 349/62 |

*Primary Examiner*—William L. Sikes
*Assistant Examiner*—Julie Ngo
*Attorney, Agent, or Firm*—Finnegan, Henderson, Farabow, Garrett & Dunner, L.L.P.

[57] ABSTRACT

A surface light source device having a light conducting member made of a transparent material, a light source disposed on the light incident edge surface of the light conducting member, a light diffusing member disposed on a front surface (light emitting surface) side of the light conducting member, a reflecting member provided on a rear surface side of the light conducting member, a prismatic sheet having a multiplicity of fine prismatic surfaces arranged on the light diffusing member; a pattern having a light diffusing characteristic is provided on the surface of the light conducting member; and the pattern is formed with the aid of half-transparent ink in which fine spherical silicon grains each having a particle diameter of 1 to 10 micrometers are mixed. According to the present invention, therefore a bright surface light source device having a uniform brightness distribution can be obtained.

18 Claims, 14 Drawing Sheets

SURFACE LIGHT SOURCE DEVICE

FIELD OF THE INVENTION

The present invention relates to a surface light source device, more particularly a surface light source device suitably used for back light systems of liquid crystal displays.

BACKGROUND OF THE INVENTION

A conventional surface light source device has a construction, for instance, as shown in FIG. 1, where a linear light source 1 such as a discharge tube, a light conducting member 2 made of a transparent material, a light diffusing plate 3, and a light reflecting member 4 are provided. The surface 2c of the light conducting member 2 is found on the side where the light reflecting member 4; and on the surface 2c, is printed a pattern 6 in white ink.

In the conventional surface light source device, a light emitted from the light source 1 is made incident upon the light conducting member 2, and then the light travels inside the light conducting member 2 being fully reflected by both the surfaces 2b and 2c, which are found on the light diffusing plate 3 side and the light reflecting member 4 side of the light conducting member, respectively. While, the light traveling inside the light conducting member is emitted from the surface 2b thereof, which is provided on the light diffusing plate 3 side of the light conducting member. The emitted light goes through the light diffusing plate 3 and then become a diffused light to constitute the surface light source.

However, in the conventional surface light source device, the light is absorbed by the white ink, etc., and thus all the light being emitted from the light emitting surface 2b of the light conducting member 2 is decreased. Therefore, the light cannot be used effectively so that only a dark surface light source device is obtained.

Another conventional surface light source device using a light conducting member is known which has the same construction as that of the device shown in FIG. 1, where the pattern is formed on the rear surface 2c of the light conducting member 2 (the surface provided on the light reflecting member 4 side of the light conducting member) by using transparent ink in which fine spherical silicon grains are mixed. It should be noted that the ink looks half-transparent because of the mixture of the silicon grains. Such a surface light source device is known where the pattern is printed on the surface 2c of the light conducting member 2 by using the half-transparent ink having spherical silicon grains therein.

In such a surface light source device using a light conducting member, only a little light is absorbed by the ink. Therefore, the amount of the light emitted from the surface 2b of the light conducting member 2 is increased as a whole. In this surface light source device, a brightness distribution, with respect to an angle θ, which is formed between the light emitted from the light emitting surface 2b of the light conducting member 2 (the light L diffused by the light diffusing plate 3) and a direction perpendicular to the light emitting surface (the direction N in FIG. 1), varies depending upon the particle diameter of the silicon grains and the amount of the grains to be mixed in the ink. However, in any case, a sufficient brightness cannot be obtained in the direction perpendicular to the surface 2b of the light conducting member 2 (θ=0 degree) or in the similar direction thereof.

In liquid crystal display devices, observation is generally conducted in a direction perpendicular to the liquid crystal display plate or in a similar direction thereof. Therefore, even if the surface light source device having a light conducting member, on which the pattern is printed by using the transparent ink with said silicon grains mixed therein, is used in the liquid crystal display device as a back light system thereof, there would be a drawback in that a sufficient amount of light cannot be obtained in a direction where the observation is conducted.

Further, in the above-mentioned conventional surface light source device using a light conducting member, since the light is diffused by fine light diffusing portions, which are provided on the light reflecting member 4 side of the light conducting member 2, or by the pattern formed in white or half-transparent ink, the light emitted from the light emitting surface of the light conducting member is also diffused with a great expansion. Therefore, the light emitted from the light emitting surface of the light conducting member includes not only the light directed in a direction perpendicular to the light emitting surface of the light conducting member or the similar direction thereof but also a great amount of light directed in other perspective directions.

When the thus constructed surface light source device is used as a back light system of a liquid crystal display device, the light directed in the perspective directions is not useful at all for operators who observe the display in a perpendicular direction with respect to the liquid crystal display device. That is to say, the light emitted from the light conducting member can not be used effectively.

Further, in the surface light source device using a light conducting member where fine light diffusing portions constitute a coarsened surface having unevenness on its cross section, which are provided on the light reflecting member side of the light conducting member, as shown in FIG. 2, the ratio of the light emitted from the light emitting surface of the light conducting member with respect to the incident light being made incident upon the light conducting member, i.e. the usage effectivity of the light, varies depending upon the shape of the cross section of the unevenness. In this case, therefore, it becomes a matter concerning the shape of the unevenness of the coarsened surface of the fine light diffusing portion.

Furthermore, in order to make the brightness greater in the surface light source device using a light conducting member, it is necessary to make the amount of light introduced from the light source 1 into the light conducting member great as considerable as possible. A device shown in FIG. 3 is known, which is arranged such that a metal foil or a film, on which silver is deposited, is formed on an inner surface of a lamp holder 20, where the light generated from the light source is introduced into the light conducting member 2 as much as possible by the reflection of the light on the metal foil or the silver film. In such a device, therefore, the efficiency of the light used is improved.

On the other hand, cold cathode tubes are generally used as a light source of such surface light source devices. The reasons why are: the diameter of a cold cathode tube is generally smaller than that of a heat cathode tube, so that the size of the device as a whole can be made thin; and that since the cold cathode tubes do not generate so much heat, they can be used for a back light system of the liquid crystal display devices without giving a bad influence to the liquid crystal display devices, and thus it is easy to take care in keeping the durability of the devices high because the temperature of the tubes do not become so high.

However, cold cathode tubes require a high voltage about 1 to 2 kV to be lit, depending upon the length of the tubes.

The frequency thereof is generally 20 to 70 kHz. In this a manner, a high voltage should be applied in order to light the cold cathode tubes. Therefore, if a metal surface is provided on the inner surface of the lamp holder, some of the electric current flow in the cold cathode tubes leaks to the inner surface of the lamp holder, so that the brightness of the tubes is decreased, and thus, a bright surface light source cannot be obtained.

Further, when some electric current leaks to the lamp holder side, electronic circuits arranged in an equipment such as a driving circuit for driving the liquid crystal display device, to which the surface light source device is mounted, are thereby affected.

Furthermore, much higher power supply is necessary to recover the brightness decreased by the leakage of the electric current to the same brightness as previously.

In order to solve these drawbacks, a device is known such that the surface of the lamp holder is arranged as a reflective surface by using a material in which Titanium oxide is mixed with poly-carbonate or ABS resin. These are available commonly as molding materials for the light reflecting members. Further, a device is known where a sheet, mainly consisting of poly ethylene terephthalate having high reflectivity characteristics, is used as a light reflecting member.

However, since the synthetic resin is used in such devices, some of the light emitted from the light source transmits through the lamp holder so that some amount of the light is lost. Therefore, a bright surface light source device cannot be obtained.

On the other hand, the surface light source device disclosed in Japanese Patent Preliminary Laid-open Application Hei4-269702 (1992) has a lamp holder in which two light reflecting surfaces are combined together. The construction of the lamp holder is shown in FIG. 4. That is to say, two light reflecting surfaces are provided inside of the lamp holder 20 and an air space 23 is formed between the light reflecting surface 21, which is provided on the light source 1 side, and the other light reflecting surface 22, which is disposed so as to surround the reflecting surface 21. The inner light reflecting surface 21 of the lamp holder is made of a metal which has a high reflectivity and the outer reflecting surface 22 is made of a white synthetic resin and arranged to work as a light diffusing reflecting surface.

However, in this conventional device, if a cold cathode tube is used as a light source, some electric current leaks through the metal reflecting surface 21 disposed near the light source 1, so that the brightness of the device is decreased.

In addition to this, when a metal layer is formed on a surface of a plate or a sheet made of a transparent synthetic resin as the light reflecting surface 21, it is considered that almost all of the light except for the light reflected by the metal surface does not transmit through the plate or the sheet but is absorbed by the plate or sheet which has a metal surface. Therefore, according to the device disclosed in the Publication, it is difficult to improve the using efficiency of the light by providing the two light reflecting surfaces in the lamp holder.

Furthermore, in the conventional device disclosed in the Publication, the members, such as the lamp holder 20, the sheetlike light diffusing member 3, and the sheet-like light reflecting member 4, are fixed on the light emitting side and/or the opposite side (light reflecting member 4 side) of the light conducting member by means of a double-sided tape or a bonding agent, as shown by the numerical reference 30 in FIGS. 5 and 6. However, on the inside surface of the double-sided tape or on the bonding agent, is provided the pattern constituted of the coarsened surfaces or a multiplicity of fine coarsened portions (fine light diffusing portions), which are formed on the rear surface 2c of the light conducting member 2 (on the surface side of the light reflecting member 4). The pattern formed on the rear surface 2c of the light conducting member 2 has a function to diffuse and reflect the light. Therefore, the brightness becomes high in the vicinity of the portion where the double-sided tape or the bonding agent is applied. The brightness distribution thereof is as shown in FIG. 7, where brightness is taken in a vertical axis and the distance measured from the light source 1 side of the light emitting surface 2b of the light conducting member 2 is taken in a horizontal axis.

As explained in the above, in the conventional surface light source device as shown in FIGS. 5 and 6, it is difficult to make the brightness distribution uniform. Particularly, there is a drawback in that the brightness becomes extremely high on the light source side of the light emitting surface of the light conducting member.

Such a lack of uniformity in the brightness distribution is not preferred when the surface light source device is used as a back light system of a liquid crystal display device. Particularly, when an operator observes the display from a perspective direction, said high brightness distribution is observed by the operator.

In order to prevent this drawback, in the liquid crystal display device in which the surface light source device as shown in FIG. 5 or 6 is used for a back light system, it is arranged such that only the center portion of the light emitting surface is used for the observation but the portion where the brightness distribution is high is not used. However, even if only the center portion is used, the device is still influenced by the light emitted from the portion where the brightness distribution becomes extremely high.

DISCLOSURE OF THE INVENTION

The present invention has for its object to provide a surface light source device using a light conducting member, on which a pattern is printed by using transparent ink with spherical silicon grains having small diameters. According to the surface light source device of the present invention, a sufficient amount of light can be obtained in a direction perpendicular to a light emitting surface of the light conducting member.

The present invention has another object to provide a surface light source device which is much brighter than the conventional surface light source device. Such a higher brightness can be obtained by defining the shape of each coarsened surface portion (shape of the unevenness of the coarsened surface) formed on the light conducting member.

The present invention has still another object namely to provide a surface light source device using a light conducting member in which an amount of loss of the light is very small, so that an observation can be conduced on a bright image surface when the device is fixed in a liquid crystal display device.

The present invention has still another object to provide a surface light source device, in which a lamp holder is provided for covering a light source and a light reflecting member having two light reflecting surfaces with an air space therebetween is arranged in the lamp holder. According to the device, the light using efficiency becomes high.

The present invention has still another object to provide a surface light source device in which it is prevented that a great amount of light is emitted from the portion of the light conducting member, where the brightness becomes extremely high; and a light emitted from the light source and then introduced into the light conducting member can be effectively used as much as possible to obtain a bright light conducting member and uniform brightness distribution thereof.

An aspect of the surface light source device according to the present invention comprises a light conducting member made of a transparent material, a light source disposed in the vicinity of a light incident edge surface of said light conducting member, a light diffusing member arranged on a light emitting surface side of the light conducting member, a light reflecting member provided on an opposite side of said light emitting surface side of the light conducting member, a pattern having a light diffusing characteristic and being formed on the light reflecting member side of said light conducting member, and a prismatic sheet having a multiplicity of prismatic portions and being arranged on the light diffusion member; the pattern having a light diffusing characteristic is formed on the surface of the light conducting member with transparent ink in which 20%–80% in weight of spherical silicon grains having their diameters of about 1–10 micrometers are mixed; and said prismatic sheet has a multiplicity of prisms each of whose apical angle is selected from a range of 80–100 degrees so as to correspond to an amount of spherical silicon grains mixed in the transparent ink. According to the device, the using efficiency of light is improved and the amount of light directed in a direction perpendicular to the light emitting surface (surface where the light diffusing member is provided) of the light conducting member becomes large.

The surface light source device according to another aspect of the present invention comprises a plate-like shaped light conducting member made of a transparent material, a linear light source, such as a fluorescent tube, disposed in the vicinity of an edge surface (a light incident edge surface) of the light conducting member, a light diffusing member arranged on a light emitting surface side of the light conducting member, and a light reflecting member provided on an opposite surface side of the light emitting surface side of the light conducting member, and a pattern composed of a plurality of fine light diffusing portions (coarsened surface portions) formed on a light reflecting member side of the light conducting member; and a cross section of each coarsened portion (cross section of unevenness constituting of the coarsened surface) is specified so as to satisfy the following condition:

0.1<ΔH/P<0.4 where the reference symbol ΔH represents a meaning difference in height of the unevenness, and the reference symbol P represents a meaning pitch of the unevenness.

According to the surface light source device of the present invention having the construction as mentioned above, a much brighter surface light source can be obtained in comparison to that of the conventional surface light source device, as shown in the embodiments explained below on the basis of data.

Further, it is preferred that the surface light source device in which not only the amount of ΔH/P satisfies the above-said condition but the different ΔH in height of the unevenness satisfies the following condition:

5 μm<ΔH<10 μm

Furthermore, it is preferred that the surface light source device in which not only the amount of ΔH/P satisfies the above-said condition but the meaning pitch P of the unevenness satisfies the following condition:

25 μm<P<100 μm

Moreover, the surface light source device is mainly preferred in that the amounts of ΔH/P, ΔH and P of the unevenness of satisfy the following conditions, respectively:

0.1<ΔH/P<0.4
5 μm<ΔH<10 μm
25 μm<P<100 μm

According to the still another aspect of the present invention, the surface light source device comprises a light conducting member made of a transparent material, a linear light source disposed in the vicinity of one of the edge surfaces (light incident edge surface) of the light conducting member, a light diffusing member arranged on a light emitting surface side of the light conducting member, a light reflecting member provided on an opposite side of the light diffusing member side of the light conducting member, and a pattern formed on the light reflecting member side of the light conducting member and constituted of a multiplicity of fine light diffusing portions which are formed by coarsened surfaces or printed by transparent ink, in which fine transparent light diffusing grains are mixed. The light reflection surface of the light reflecting member has its shape in that a plurality of triangular rods are continuously arranged; the cross sections of each rod in the direction perpendicular to the linear light source is triangular-shaped, and the top portions of the triangular rods are extended in a direction parallel to the light source, and further, the inclined angle on the light source side of each cross-sections of the triangular rods is about 35 degrees.

The surface light source device according to the still another aspect of the present invention is characterized in that a light emitted from a cold cathode tube, which is arranged inside of a lamp holder, is made incident upon one of the surfaces of the light conducting member, which is made of the transparent material, and the light is then emitted from the other surface (light emitting surface) of the light conducting member, and a reflecting body, which is arranged inside of the lamp holder has a double construction of two light reflecting surfaces with an air space. Both the light reflecting surfaces are white, and at least one of the light reflecting surfaces, i.e. a first light reflecting surface, which is provided near the cold cathode tube, is constituted of a sheet made of white synthetic resin.

It may also be possible to arrange that the inside surface of the lamp holder has the white synthetic resin and use the white inside surface as a second light reflecting surface. The second light reflecting surface is arranged in a position farther from the cold cathode tube.

The surface light source device according to still another aspect of the present invention comprises a plate-like light conducting member made of a transparent material, a linear light source, such as a cold cathode tube, arranged in the vicinity of a light incident edge surface of the light conducting member, a light diffusing member, such as a light diffusing sheet or a light diffusing plate, provided on a light emitting surface side of the light conducting member, a light reflecting member arranged on an opposite side of the light emitting surface side of the light conducting member, and a lamp holder covering the linear light source; and on the light reflecting member side of the light conducting member is formed a coarsened surface, a pattern composed of a multiplicity of fine coarsened portions, or a printed pattern; and said coarsened surface, or said pattern is arranged such that density distributions thereof suitably vary so as to emit the light, which has been introduced in the light conducting member, from the light emitting surface thereof with a uniform brightness; further, an opening of the lamp holder is connected to the light conducting member so as to cover the light incident edge side of the light emitting surface thereof and the light incident edge side of the light reflecting member side surface thereof; and on the opening of the lamp holder are connected the light diffusing member and the light reflecting member; and a light shielding treatment is conducted at least in the vicinity of the part of the light diffusing member, from which the light is emitted with an extremely high brightness distribution because the opening of the lamp holder is connected there. It should be noted that the material for the light shielding has its reflection efficiency of between 40 to 60%.

BEST MODE FOR CARRYING OUT THE INVENTION

Embodiments of the surface light source device according to the invention will be explained below.

Figure 1:
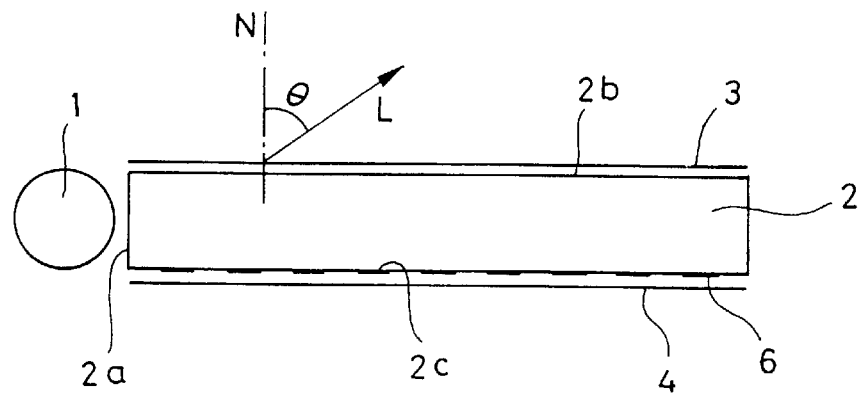
FIG. 1 is a cross sectional view showing a conventional surface light source device.
Figure 2:
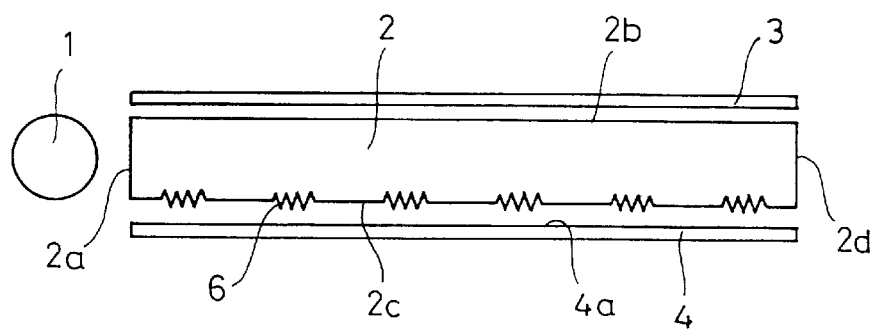
FIG. 2 is a cross-sectional view representing another conventional surface light source device where fine light diffusing portions having unevenness on the cross section are provided.
Figure 3:
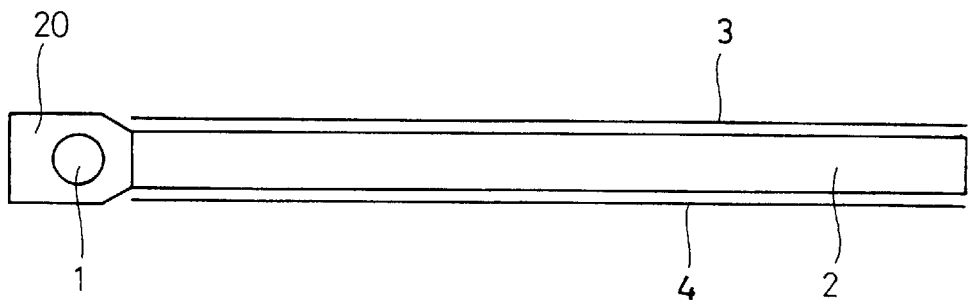
FIG. 3 is a cross sectional view depicting a conventional surface light source device which includes a lamp holder.
Figure 4:
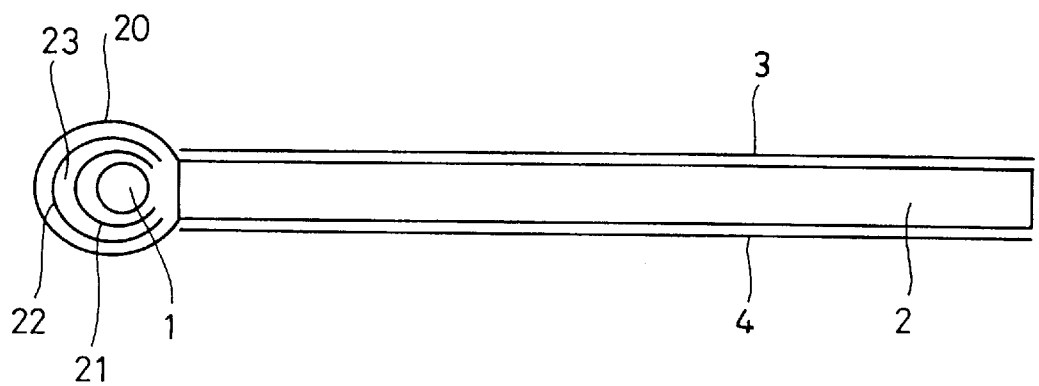
FIG. 4 is a cross-sectional view illustrating still another conventional surface light source device which has a light reflecting member for covering a light source.
Figure 8:
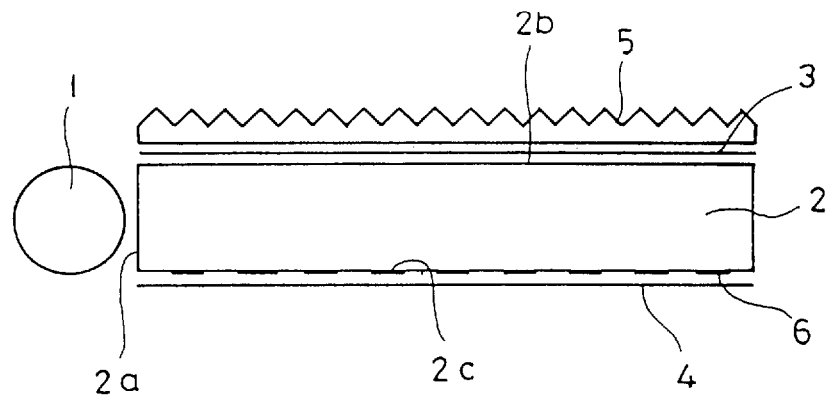
FIG. 8 is a cross-sectional view illustrating a surface light source device according to the first embodiment of the present invention.
Figure 9:
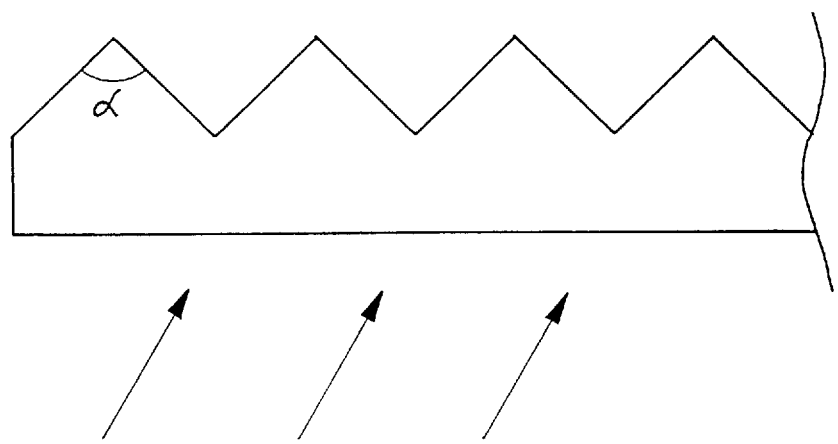
FIG. 9 is a cross-sectional view representing a prismatic sheet in an enlarged scale, which is used in the surface light source device illustrated in FIG. 8.

FIG. 8 is a schematic view showing a first embodiment of the surface light source device according to the present invention. In FIG. 8, the numerical reference 1 denotes a linear light source, 2 a light conducting member, 3 a light diffusing plate, 4 a light reflecting member, and 6 represents a pattern having a light reflecting characteristic. The construction of these members is the same as that of the conventional surface light source device, which is shown in FIG. 1. However, in the first embodiment, a prismatic sheet 5 is further arranged on the light diffusing plate 3, and a pattern is formed by using transparent ink, in which 20%–80% in weight of spherical silicon grains having their diameters of 1–10 micrometers are mixed. The apical angle α of each of the prismatic portions of the prism sheet, which is shown in FIG. 9, is selected from the range of 80–100 degrees.

Figure 10:
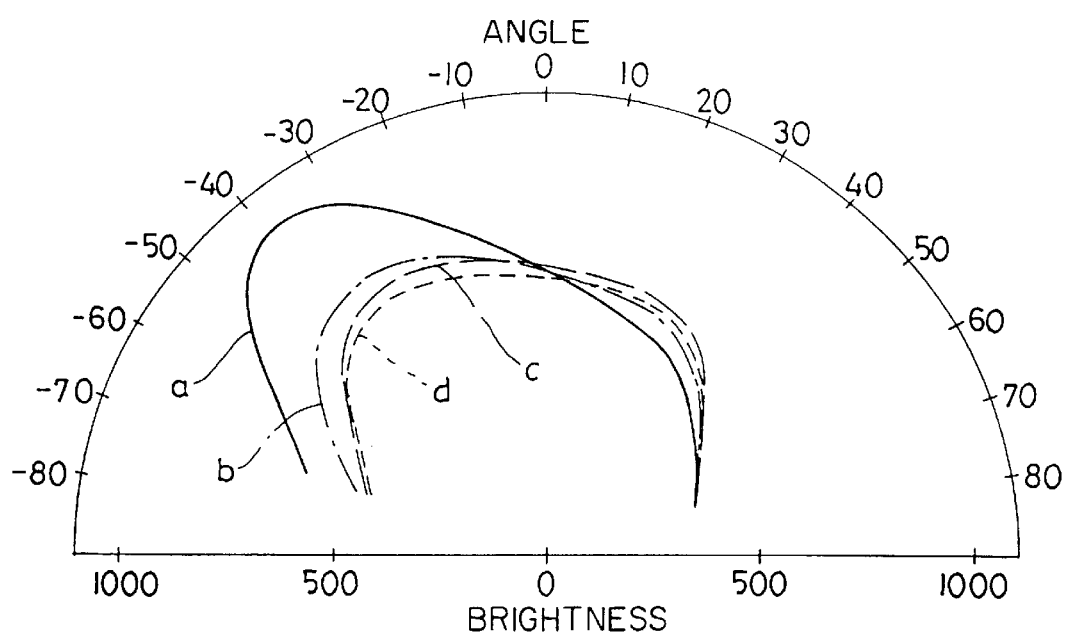
FIG. 10 is a graph depicting an example of the brightness distribution with respect to an angle of the light emitted from the conventional surface light source device shown in FIG. 1 when the amount of the spherical silicon grains to be mixed in the transparent ink is varied.

FIG. 10 is a graph showing brightness distributions on the light diffusing plate 3 with respect to an angle θ, which is measured in the conventional surface light source device shown in FIG. 1. It should be noted that the same patterns are formed on the light conducting members by printing, etc. varying the amount of the spherical silicon grains to be mixed in the transparent ink for forming the pattern. In this graph, the curves a, b, c and d show the measurement results of the brightness distribution with respect to the light incident angle θ, under the condition that the patterns are formed on the light conducting members, by varying the mixing ratio of the spherical silicone grains to be mixed of 20%, 40%, 60% and 80% in weight, respectively. It should be noted that the angle is determined in such a manner that the right of the light emitting surface of the light conducting member 2 is taken at zero degree and the inclination from the perpendicular toward the light source 1 side is taken as minus and the inclination toward the opposite side of the light source 1 is taken as plus.

As apparent from FIG. 10, in accordance with the amount of the spherical silicon grains mixed into the transparent ink, the brightness distribution of the emitting light with respect to the angle θ is varied. Therefore, by studying the brightness distribution of the emitting light with respect to the angle θ and then selecting a suitable prism sheet which corresponds to the brightness distribution, it becomes possible to realize a surface light source device in which a great amount of light is emitted from the light conducting member in the perpendicular direction with respect to the light incident surface of the member.

Figure 11:
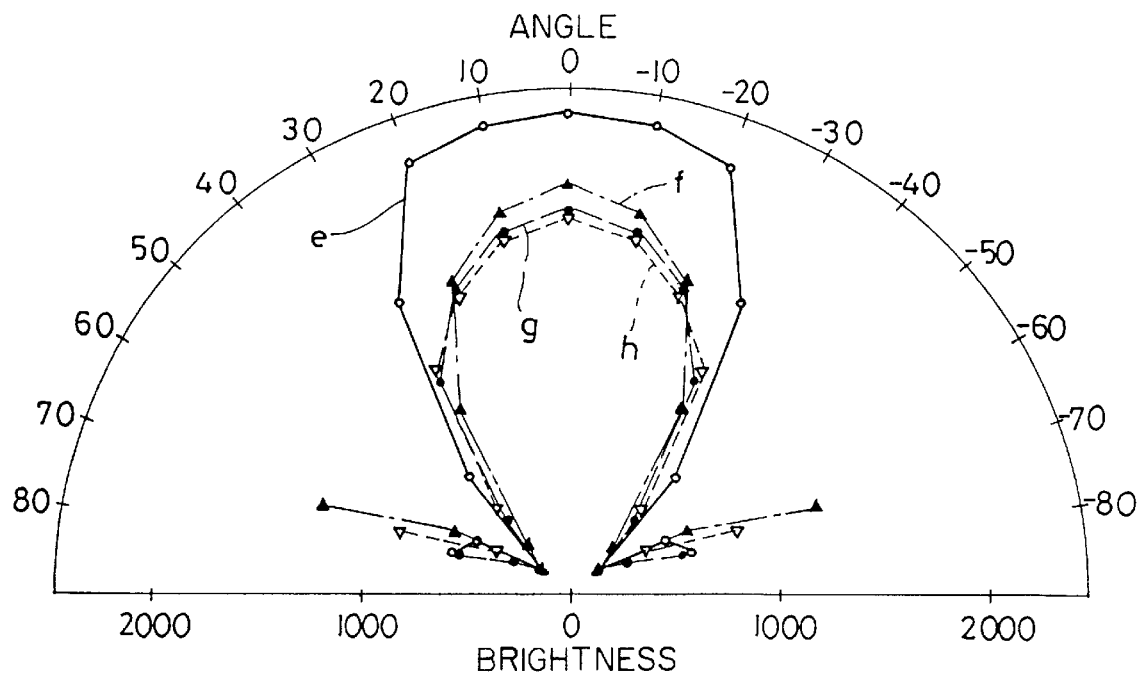
FIG. 11 is a graph showing an example of the brightness distribution with respect to an angle of the light emitted from the surface light source device shown in FIG. 8 when the amount of the spherical silicon grains to be mixed in the transparent ink is varied and a prismatic sheet corresponding to the mixed amount of the silicon grains is provided.

FIG. 11 shows the experimental results of the brightness distribution of the emitting light with respect to the angle θ in the surface light source device where a suitable prismatic sheet is used. The type of prism sheet is selected taking the variation of the brightness distribution with respect to the angle θ of the emitting light due to the difference of the amount of spherical silicon grains to be mixed in the transparent ink into consideration.

In FIG. 11, the curve e represents the brightness distribution with respect to the angle θ of the emitting light. The brightness distribution is measured under the condition that a prismatic sheet made of poly carbonate having a diffractive index of 1.585 is disposed on the light diffusing plate 3. It should be noted that 20% in weight of the spherical silicon grains are mixed into the transparent ink and the apical angle of the prismatic portion of the prismatic sheet is 80 degrees. The curve f represents a brightness distribution of the emitting light with respect to the angle θ. The brightness distribution is measured under the condition that a prismatic sheet made of poly carbonate having a diffractive index of 1.585 is disposed on the light diffusing plate 3, but 80% in weight percents of the spherical silicon grains are mixed into the transparent ink and the apical angle of the prismatic portion is 90 degrees; the curve g represents a brightness distribution measured under the condition that a prismatic sheet made of poly carbonate having a diffractive index of 1.585 is disposed on the light diffusing plate 3, but 80% in weight of the spherical silicon grains are mixed in the transparent ink and the apical angle of the prismatic portion is 100 degrees; and the curve h represents a brightness distribution measured under the condition that the prismatic sheet made of poly ethylene terephthalate having a diffractive index of 1.575 is disposed on the light diffusing plate 3, but 80% in weight of the spherical silicon grains are mixed into the transparent ink and the apical angle of the prismatic portion is 95 degrees.

In all of the above mentioned four cases, the brightness becomes greatest when the angle θ of the emitting light is 0 degree. It should be noted that the combinations of the mixed amount of silicon grains and the apical angle of the prismatic sheet correspond to the curves a, f, g and h, respectively. In addition to this, the values of the brightness are greater than those shown in FIG. 10.

Particularly, in the case that 20% in weight of the silicon grains are mixed into the transparent ink and the prism sheet made of poly carbonate having a diffractive index of 1.585, and having an apical angle of 80 degrees is arranged on the light diffusing plate 3, a remarkable effect can be obtained.

As stated in above, in the first embodiment of the surface light source device according to the present invention, the brightness distribution becomes greatest in a direction perpendicular to the light emitting surface of the light conducting member. Therefore, when the device is used in the back light system of the liquid crystal display device, it is possible to observe the liquid crystal display with an extremely bright image surface.

In the present invention explained in the above, the silicon grains having their diameters of 1 to 10 micrometers are mixed into the transparent ink for forming the pattern. If the diameter of the grain is smaller than 1 micrometer, a color separation would be caused and then the emitting light would be colored. Such a device could not be used for the back light system of the liquid crystal display devices. Contrary to this, if the diameter of the grain is greater than 10 micrometers, it would cause a problem that when an operator was to observe the light emitting surface of the surface light source device with naked eyes, the operator could recognize that the brightness on the part where the silicon grains exist is different from that on the other part. It is not only inconvenient for using the device as a brightening device but also causes the other problem that it becomes difficult to print the pattern by using the ink including such large silicon grains and thus the printing accuracy decreases.

The most suitable amount of silicon grains to be mixed into the transparent ink is between 20% to 80% in weight. If the amount is less than 20% in weight or greater than 80 in weight, the effect by the silicon grains mixed into the transparent ink becomes unremarkable.

Further, the apical angle of each prismatic portion of the prism sheet should be selected from the range of 80 to 100 degrees. If the apical angle is less than 80 degrees, an amount of the light exceeding over the critical angle increases, because poly carbonate, polyethylene terephthalate, or poly methyl-methacrylate is generally used for the material of the prism sheet. Such a light exceeding over the critical angle cannot be emanated from the prism portions, and thus the prism sheet would not work any more. Contrary to this, if the apical angle is greater than 100 degrees, the prism sheet becomes like a plane plate so that the effect as a prism sheet cannot be obtained. According to the experiments, it is proved that the angular distribution of the light emitted from the light conducting member is varied in accordance with the amount of the silicon grains mixed into the transparent ink. The ability of the prism sheet is determined by the diffracting index of the material of the prism sheet and the apical angle of each prismatic portion of the prism sheet. Therefore, in order to respond to the variation of the distribution of the angle of the emitting light, the type of the prismatic sheet should be selected in a suitable manner in accordance with the amount of silicon grains mixed into the transparent ink.

The present inventor carried out the invention by firstly studying the relation among the diameter and the amount of the silicon grains to be mixed into the transparent ink, which is used for printing a pattern on the reflecting member side surface of the light conducting member of the surface light source device, and an amount of light emitted from the light emitting surface of the light conducting member, and its distribution (under the condition that the prism sheet is not provided); and further studying the suitable combination of the diameter and the amount of silicon grains to be mixed into the transparent ink and the prism sheet having different apical angle on the basis of the result of the first study. The purpose of the present invention is achieved in that the pattern is formed on the light conducting member by using the transparent ink in which the spherical silicon grains, whose diameters and amount are selected from the above mentioned ranges, are mixed, and the prism sheet having a multiplicity of prismatic portions whose apical angle is selected from the above mentioned range is arranged on the light conducting member.

Figure 12:
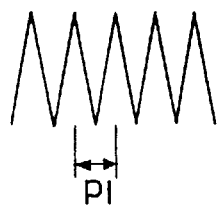
FIGS. 12, 13 and 14 are schematic views illustrating the shapes of the unevenness having a constant depth, respectively, which are formed on the lower surface of the light conducting member.
Figure 13:
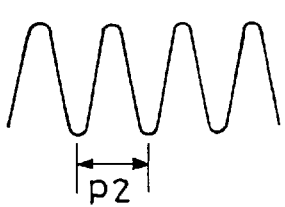
Figure 14:
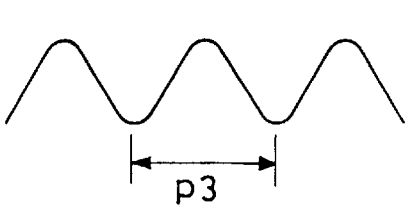
Figure 15:
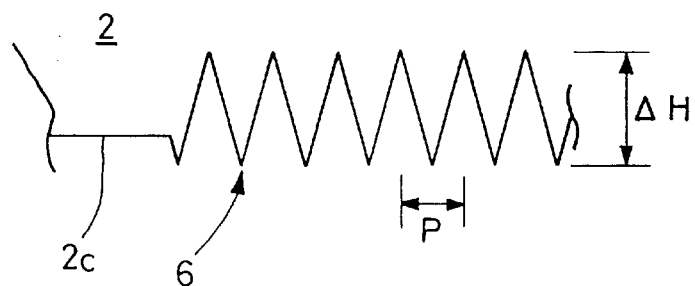
FIG. 15 is a schematic view for explaining the parameters to determine the unevenness of the coarsened surface formed on the lower surface of the light conducting member in the second embodiment of the present invention.

In the surface light source device according to the present invention (second embodiment), the pattern to be formed on the light conducting member is constituted of coarsened Surfaces having cross sections as shown in FIGS. 12, 13 and 14. A bright surface light source device can be obtained by selecting the height and the pitch of the unevenness constituting of the cross section in a suitable manner.

Such a surface light source device according to the present invention (second embodiment) is achieved as a result of following experiments. The present inventor found out that the surface light source device having such a construction mentioned in the above is much more brighter than the conventional surface light source device.

When a coarsened surface is formed on the light conducting member with a constant depth of the unevenness of the coarsened surface as shown in FIG. 12, 13 or 14, the brightness becomes different depending on the pitch of the unevenness, nevertheless the depth of the unevenness is constant. That is to say, the brightness becomes sometimes different but sometimes the same in the cases that the pitch P1 is small as shown in FIG. 12, the pitch P2 is medium as shown in FIG. 13, and the pitch 3 is large as shown in FIG. 14.

To the contrary, if the coarsened surface is formed with a constant pitch but the depth of unevenness is controlled, the brightness of the light conducting member are sometimes different or sometimes the same depending on the depth of the unevenness.

The present invention (second embodiment) is achieved on the basis of the consideration that the brightness of the light emitted from the light emitting surface of the light conducting member is determined by not the depth or the pitch of the unevenness of the coarsened surface but an inclination of the shape of the unevenness. That is to say, when the inclination is in a certain range, the brightness of the light conducting member becomes highest and when the inclination becomes greater or smaller exceeding over the range, the brightness would be decreased. There are many factors for representing the coarsened surface consists of the pattern formed on the light reflecting member side surface of the light conducting member. The present inventor carried out the invention taking the fact into consideration that one of the factors for making an influence to the brightness of the surface light source device is not the depth or the pitch of the unevenness but the shape, particularly inclination, of the unevenness of the coarsened surface, and then repeatedly conducting experiments. Actually, the inclination of the unevenness is represented by a parameter of a ratio ($\Delta H/P$) of a meaning difference $\Delta H$ in the height of the unevenness and a meaning pitch P thereof: and the relation between the parameter and the brightness was obtained by experiments. It is recognized by the inventor that the brightness becomes great when the value of $\Delta H/P$ is within the range.

Figure 16:
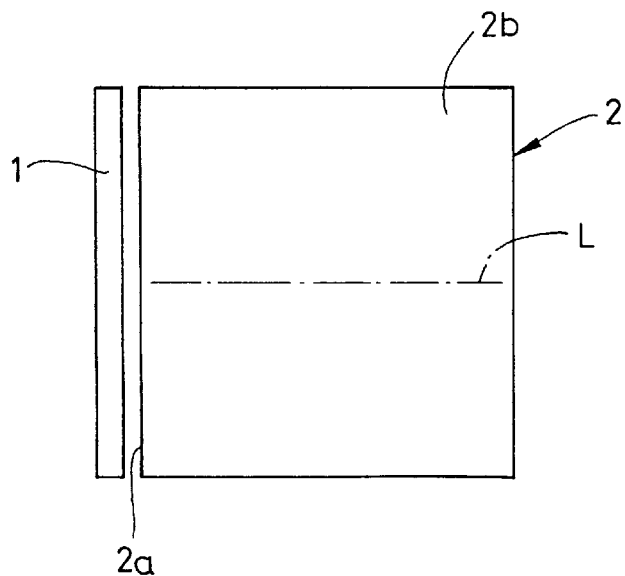
FIG. 16 is a schematic view showing a position where the brightness distribution of the emitting light should be measured.

The experimental results are shown below. It should be noted that the measurement values shown in the below-mentioned table are meaning values of the values measured on the line L shown in FIG. 16.

TABLE

|  | H ($\mu$m) | P ($\mu$m) | $\Delta H/P$ | Brightness (nt) |
|---|---|---|---|---|
| Condition 1 | 4.0 | 20 | 0.250 | 3400 |
| Condition 2 | 4.0 | 25 | 0.160 | 3200 |
| Condition 3 | 4.0 | 40 | 0.100 | 3000 |
| Condition 4 | 5.0 | 20 | 0.250 | 3200 |
| Condition 5 | 5.0 | 25 | 0.200 | 4000 |
| Condition 6 | 5.0 | 50 | 0.100 | 4000 |
| Condition 7 | 5.0 | 100 | 0.050 | 2200 |
| Condition 8 | 7.0 | 20 | 0.350 | 3000 |
| Condition 9 | 7.0 | 25 | 0.280 | 4200 |
| Condition 10 | 7.0 | 70 | 0.100 | 4000 |
| Condition 11 | 7.0 | 100 | 0.070 | 2000 |
| Condition 12 | 9.0 | 20 | 0.450 | 2800 |
| Condition 13 | 9.0 | 25 | 0.360 | 4200 |
| Condition 14 | 9.0 | 90 | 0.100 | 4000 |
| Condition 15 | 9.0 | 100 | 0.090 | 3500 |
| Condition 16 | 10.0 | 20 | 0.500 | 2600 |
| Condition 17 | 10.0 | 25 | 0.400 | 4000 |
| Condition 18 | 10.0 | 100 | 0.100 | 4000 |
| Condition 19 | 10.0 | 110 | 0.091 | 3100 |
| Condition 20 | 11.0 | 25 | 0.440 | 3000 |
| Condition 21 | 11.0 | 100 | 0.110 | 2900 |
| Condition 22 | 11.0 | 110 | 0.100 | 2700 |

As apparent from the above-mentioned Table, under the conditions 7, 11, 12, 16, 21 and 22, the brightness is small in comparison with the other conditions. This means, the brightness on the light conducting member depends on the fact that the value of $\Delta H/P$ is smaller or greater than the others. As a result, it is proved that when the value of $\Delta H/P$ is within the range (A) shown below, a bright surface light source device can be obtained.

$$0.1 < \Delta H/P < 0.4 \quad (A)$$

If the meaning difference $\Delta H$ in height of the unevenness is much too great, even when the value of $\Delta H/P$ is within the range (A), no satisfied effect can be obtained as shown in Condition 22. In such a case, it would be difficult to form the coarsened surface on the light conducting member. Additionally, if the value of $\Delta H$ is much too small, it also becomes difficult to form the coarsened surface on the light conducting member. In such a case, the brightness increases to some degree, but it is not sufficient as shown in Condition 1, 2,or 3. Therefore, it is preferred that the value of $\Delta H$ is within the following range (B).

$$4.0 \ \mu m < \Delta H < 10 \ \mu m \quad (B)$$

Further, it is also not preferred that the meaning pitch P is much too great or much too small for the same reason. As clear from the experimental data mentioned in the above table, when the meaning pitch P is small, a certain effect can be obtained in brightness but it does not become remarkably bright; and even if the value of ΔH/P is set within said range, the effect cannot be sufficiently obtained. Therefore, it is much more preferred to set such that the value of P is within the following range (C).

$$25 \ \mu m < P < 100 \ \mu m \qquad (C)$$

Particularly, in case both the values of ΔH and P are out of the above-mentioned ranges as shown in the condition (22), even if the value of ΔH/P is within the range (A), it is difficult to obtain a sufficient effect.

For the above reasons, it is most preferred to settle the values of ΔH/P, ΔH. and P are in the following ranges, respectively.

0.1<ΔH/P<0.4

5 μm<ΔH<10 μm

25 μm<P<100 μm

As stated in the above, the surface light source device according to the present invention (the second embodiment) comprises a plate-like light conducting member made of a transparent material, a linear light source such as fluorescent tube disposed in the vicinity of a light incident edge surface of the light conducting member, a light diffusing member arranged on a light emitting surface side of the light conducting member, and a light reflecting member provided on an opposite side of said light incident surface side of the light conducting member; and said light conducting member comprises a pattern on the light reflecting member side thereof (the opposite side surface of the light incident surface); and the pattern is composed of a multiplicity of fine light diffusing portions formed by coarsened surfaces (coarsened surface portions); and the surface light source device is arranged that when ΔH/P is defined as a parameter representing the roughness of the coarsened surface portion (shape of unevenness), the value of ΔH/P is within the above mentioned ranges.

Further, in the surface light source device according to the present invention, it is preferred that the parameter ΔH is within the above mentioned range and/or the parameter P satisfies the above mentioned range, respectively.

Furthermore, in the present invention, it is mostly preferred that either of the values of the parameters ΔH/P, ΔH and P satisfy the above-mentioned ranges.

Figure 17:
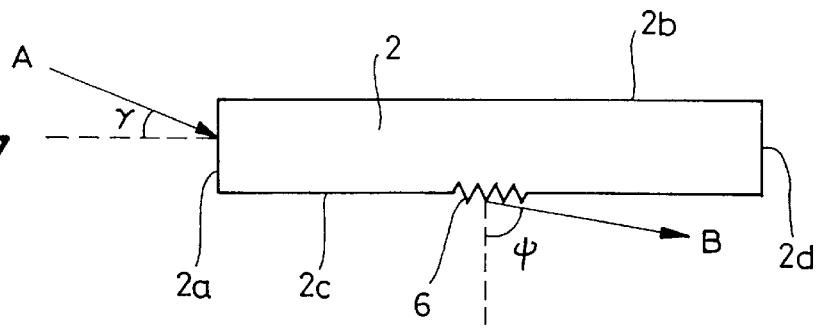
FIG. 17 is a schematic view for explaining a relationship between the light emitted from the light conducting member of the surface light source device and the light emitted from the coarsened surface thereof.

In the surface light source device according to the present invention, it may be possible to arrange that the light emitting surface of the light conducting member and the opposite surface thereof are not parallel to each other. As shown in FIG. 17, after a laser beam A is made incident upon the parallel plate-like light conducting member at an angle γ, the light is transmitted through the coarsened surface portion 6 and then emitted therefrom with an emitting angle φ as a light beam B. Light emitting angles φ are measured by varying the light incident angle γ of the laser beam A; as a result, the angles φ are almost constant while the incident angle is varied. That is to say, the emitting angle φ is almost constant without regarding to the light incident angle θ.

It is proved from this fact that the incident angle of the light with respect to the coarsened portion 6 does not make influence to the function of the coarsened surface portion 6 for the light which has arrived on to the coarsened portion 6.

Figure 18:
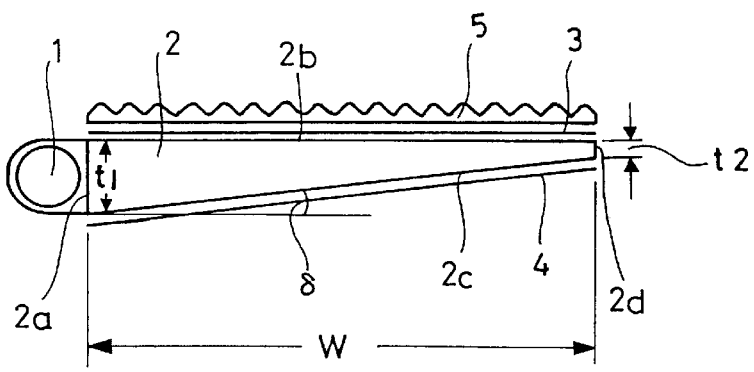
FIG. 18 is a cross-sectional view illustrating a surface light source device according to the second embodiment of the present invention.

As a result of some experiments, it is recognized that so far as the inclined angle α of the surface 2c of the light conducting member is in the range from about 0 to 4 degrees as shown in FIG. 18, the relation between the brightness of the light emitted from the light emitting surface 2b of the light conducting member and the shape of the coarsened portion 6 is almost the same as the relation between those of the light conducting member where the light emitting surface 2b and the surface 2c are arranged to be parallel to each other.

Therefore, the present invention can be also applied to the surface light source device in which the lower surface 2c of the light conducting member is inclined by an angle δ of about 0 to 4 degrees.

In case of the surface light source device where the lower surface 2c of the light conducting member as a whole is arranged as a coarsened surface, if the shape of the fine unevenness of the coarsened surface is varied within the ranges mentioned above the amount of light emitted from the light emitting surface 1b of the light conducting member increases in comparison with the conventional device. Therefore, the surface light source devices, which are arranged such that a coarsened surface on the light reflecting member side of the light conducting member and the brightness of the emitting light is made uniform with the aid of the coarsened surface, belong to the present invention, so far as the shape of the unevenness of the coarsened surface is determined by the factors of ΔH/P, ΔH/P and ΔH, ΔH/P and P or ΔH/P, ΔH and P which satisfy the ranges (A), (B), or (C). It should be noted that the surface light source devices in which a coarsened surface is found on almost whole area of the light reflecting member side surface of the light conducting member but the roughness of the coarsened surface varies so as to obtain a uniform brightness distribution may also belong to the present invention so far as the shape of the unevenness of the coarsened surface satisfy the factors.

Figure 19:
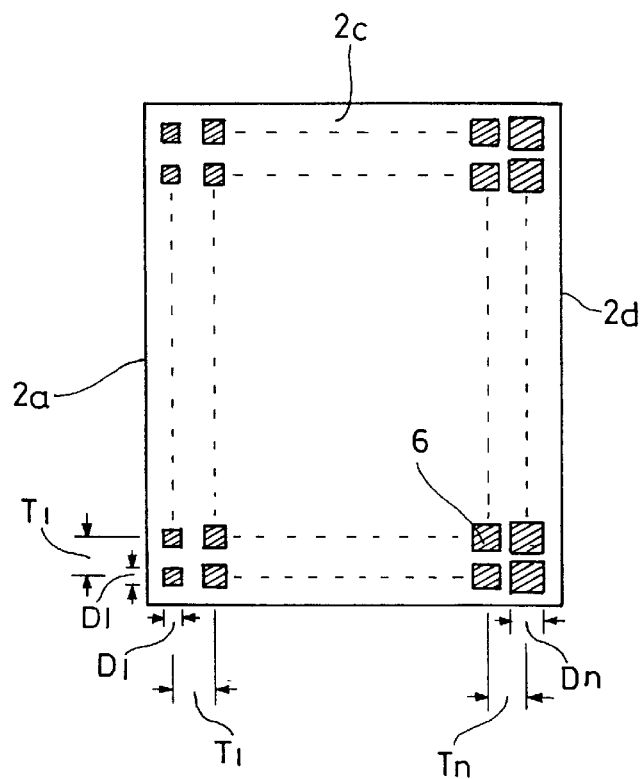
FIG. 19 is a schematic view depicting a pattern composed of fine light diffusing portions formed on the lower surface of the light conducting member in the second embodiment of the present invention.

An embodiment according to the surface light source device of the present invention (third embodiment) will be explained below. FIGS. 18 and 19 are schematic views showing the third embodiment according to the present invention: FIG. 18 shows a cross-section of the device cut along a direction perpendicular to a longitudinal direction of the linear light source and FIG. 19 shows a pattern formed on a lower surface of the light conducting member.

In FIG. 18, the numerical reference 1 denotes a linear light source such as a cold cathode tube, 2 a light conducting member made of a transparent resin, 3 a light diffusing member, 4 a light reflecting member, 5 represents a prism sheet. In FIG. 18, the light conducting member 2 is drawn in such a manner that the lower surface thereof is inclined with a great inclination, but the actual length W of the light conducting member is 53 mm, and the thickness thereof on a light source 1 side, i.e. the thickness t1 of the light incident edge surface 2a side of the light conducting member, is 4.0 mm, and the thickness t2 thereof on an opposite side surface side 2d is 1.5 mm. Therefore, the actual inclination δ thereof is only 2.7 degrees, which is very small. On the lower surface 2c of the light conducting member 2 of this embodiment, is formed a pattern composed of a plurality of coarsened portions 6 as shown in FIG. 19. The coarsened portions 6 are composed of fine unevenness determined by the values of ΔH and P satisfying the above ranges (A), (B) and (C). The pattern is arranged such that the size of the coarsened portion is gradually varied. The smallest coarsened portion has its values of D1=0.6 mm, T1=1.0 mm and the biggest coarsened portion has its values of Dn=0.9 mm and Tn=1.0 mm.

In the light conducting member having its construction shown in FIG. 18 and a pattern shown in FIG. 19, when ΔH=7 micro meters and P=25 micro meters, the brightness distribution of the light emitted from the prism sheet 5 becomes extremely uniform and the brightness thereof becomes 4200 [nt] which is improved about 15% in comparison with the same type conventional device.

In the above mentioned embodiment, on the surface 2c of the light conducting member 2 is formed a pattern composed of a plurality of coarsened portions 6; but it may b e possible to arrange such that the almost whole surface 2c is arranged as a coarsened surface and the roughness of the coarsened surface 1c varies so as to make the brightness distribution of light emitted from the light emitting surface uniform, so far as the shape of the unevenness constituting the coarsened surface has the values of ΔH and P satisfying the ranges (A), (B) and (C).

Figure 20:
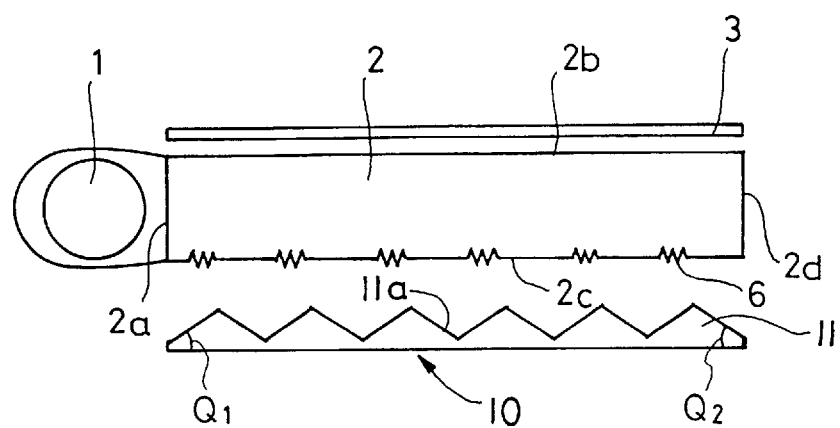
FIG. 20 is a cross-sectional view representing a surface light source device according to the third embodiment of the present invention.

FIG. 20 is a schematic view showing a construction of the third embodiment according to the present invention. The numerical reference 1 represents a linear light source such as a cold cathode tube, 2 a light conducting member made of a transparent material, 3 a light diffusing plate as a light diffusing member, 6 a fine light diffusing portion formed on a surface 2c of the light conducting member 2 which is an opposite side of a light emitting surface 2b. The construction of the device is substantially the same as that of the first embodiments.

The numerical reference 10 denotes a light reflecting member. The light reflecting member 10 has a structure in that a cross section thereof, which is cut along a direction perpendicular to the longitudinal direction of the linear light source 1, has a plurality of triangular shaped portions 11; and both the inclined angles $Q_1$ and $Q_2$ of the triangular shaped portions 11 are 35 degrees, respectively.

In the third embodiment, the light emitted from the linear light source 2 being made incident upon the light incident edge surface 2a of the light conducting member 2 is transmitted to an opposite edge surface 2d thereof being totally reflected by the surface 2c and the light emitting surface 2b. While, some of the light goes through the fine diffusing portions 6 formed on the surface 2c, without being totally reflected. The emitting angle of the light going through the fine diffusing portions 6 is about 70 degrees. The light is reflected by a light reflection surface 11a of the light reflecting member 10 and then made incident upon the surface 2c of the light conducting member 2 at a substantially right angle and then emanated from the light emitting surface 2d thereof at the same angle (at a right angle). The light further goes through the light diffusing plate 3 to become a diffusing light. As is clear from the above explained experimental result, the diffusing light has its brightness distribution within a range of 0 degree plus or minus 10 degrees, and therefore the purpose of the present invention may be achieved.

The present invention (the third embodiment) is carried out based on the experimental results of making the light incident upon the light incident edge surface 2a of the light conducting member 2, which is made of a transparent material with various incident angles, and by studying how the light proceeds in the member after the lights arrive at the fine diffusing portion formed on the opposite side surface of the light incident surface of the light conducting member.

The experiments will be explained in below referring to FIG. 17, and FIGS. 22 to 27. FIG. 17 is a schematic view showing the surface light source device according to the present invention where a laser beam A is made incident upon the light incident edge surface 2a of the light conducting member 2 at a light incident angle γ. On the light conducting member, fine light diffusing portions 6, which are generally used in the surface light source device, are provided. In the device shown in FIG. 17, the light incident angle γ is greater than 0 degree but smaller than 90 degrees. Such incident light being made incident upon the member at an incident angle γ is emitted from the surface 2c with an emitting angle φ after transmitted through the fine light diffusing portions 6. The transmitted light beam is shown by the reference B.

Figure 22:
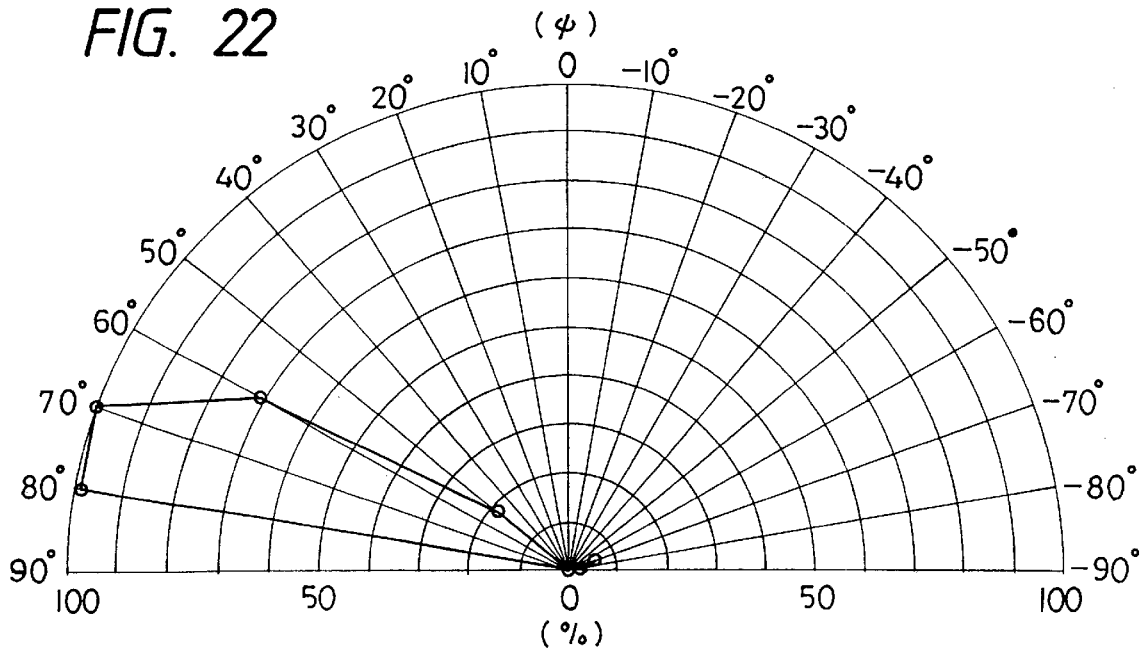
FIG. 22 is a graph illustrating a result of the experiments which are conducted under the condition that the relationship shown in FIG. 17 is satisfied.

In FIG. 22, is shown a brightness distribution of the light emitted from the surface 2c of the light conducting member at a light emitting angle φ, i.e. the light transmitted through the fine diffusing portions 6, when the light is made incident upon the light conducting member at an incident angle γ. It should be noted that the experiment is conducted as shown in FIG. 17. As apparent from the experimental result, it is proved that the laser beam A, which is made incident upon the light conducting member at an arbitrary incident angle γ, is emitted from the fine diffusing portions 6. The light diffused from the diffusing portions within a range of φ=60 to 80 degrees. According to the experiments, it is proved that this tendency is almost the same without respect to the incident angle γ.

Figure 23:
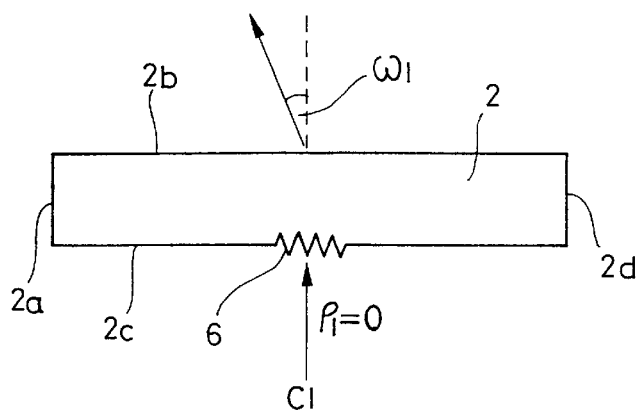
FIG. 23 is a schematic view representing a light emitting direction of the light emitted from the light conducting member when the light is made incident upon the lower surface of the member.
Figure 24:
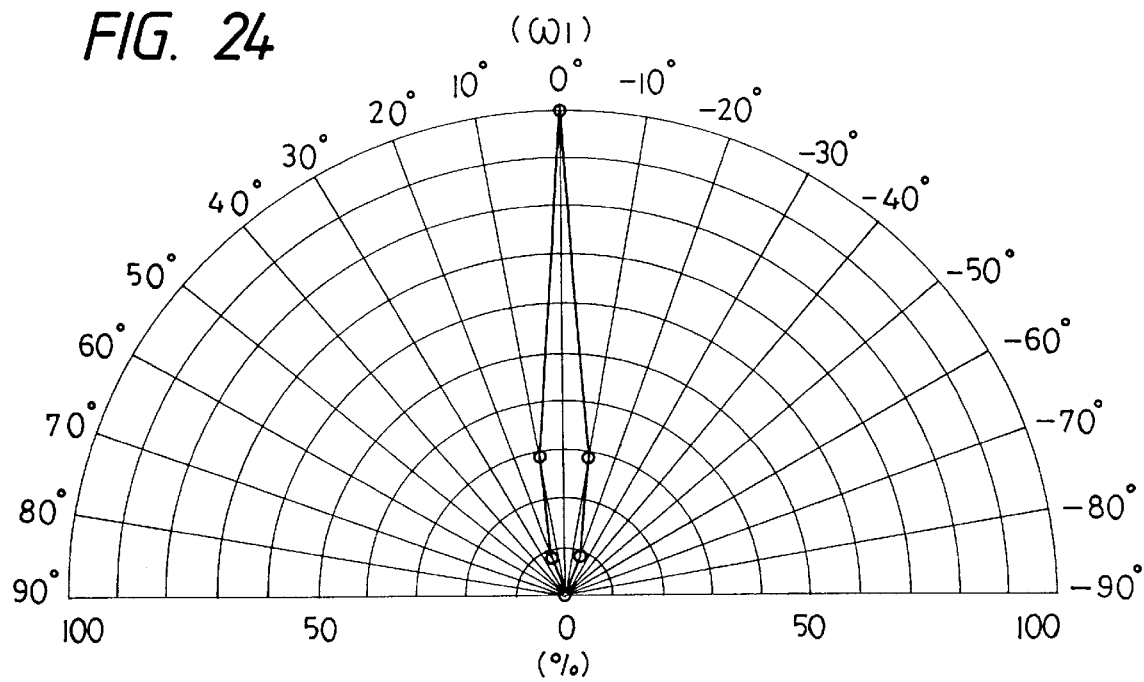
FIG. 24 is a graph depicting a result of the experiments which are conducted under the condition shown in FIG. 23.

Further, the brightness is measured under the condition that a laser beam C1 is made incident upon the surface 2c of the light conducting member 2 at an incident angle ρ1=0, and then emitted from the light emitting surface 2b of the light conducting member 2, as shown in FIG. 23. FIG. 24 shows the result of this experiment. As apparent from FIG. 24, almost all of the light emitted from the light emitting surface 2b of the light conducting member 2 goes into the direction of an emitting angle ω1=0 degree, when the light is made incident upon the surface 1c of the light conducting member 1 at an incident angle ρ1 of 0 degree.

Figure 25:
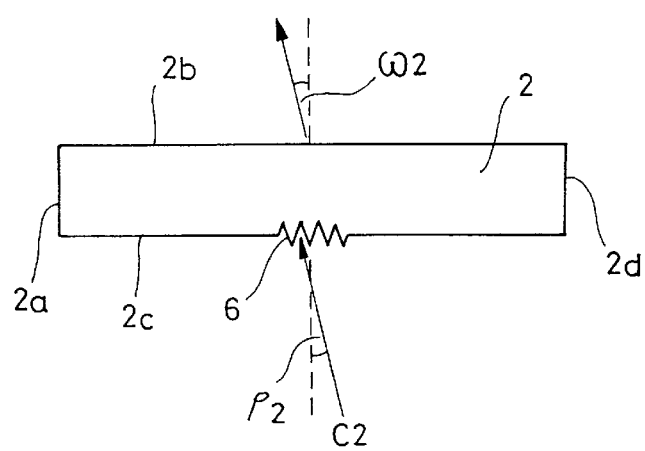
FIG. 25 is a schematic view showing a light emitting direction of light emitted from the light conducting member when the light is made incident upon the lower surface of the member in a direction perpendicular with respect to the lower surface.
Figure 26:
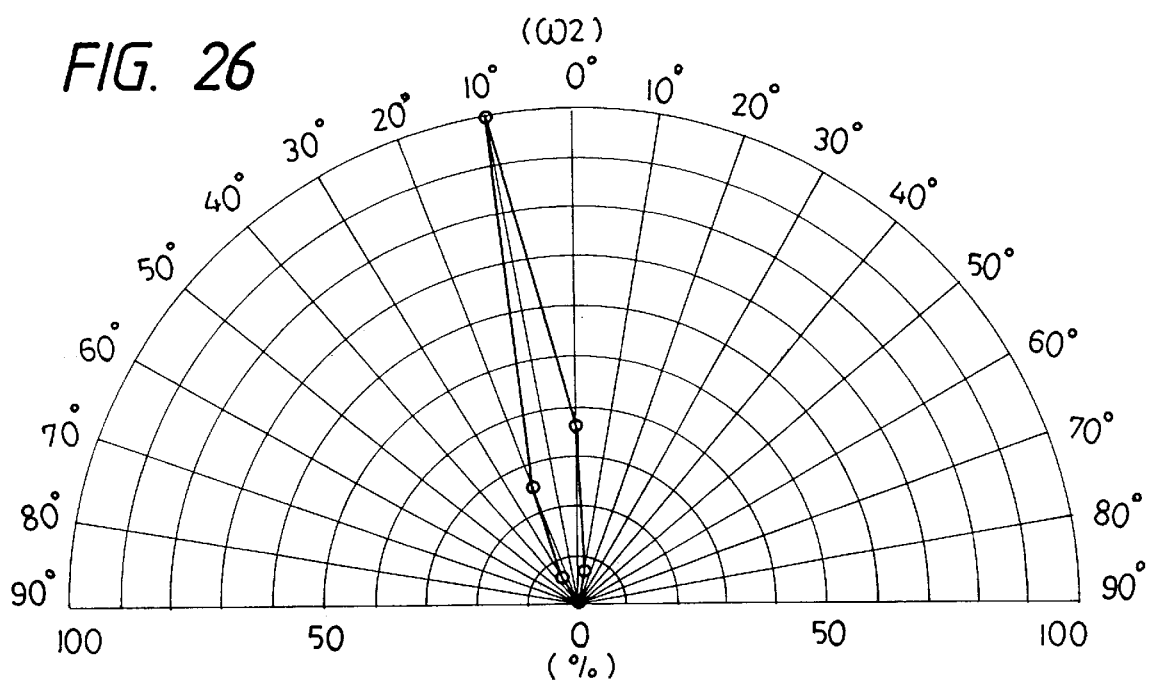
FIG. 26 is a graph illustrating a result of the experiments which are conducted under the condition shown in FIG. 25.

Furthermore, as shown in FIG. 25, when the laser beam C2 is made incident upon the surface 2c of the light conducting member 2 at an incident angle ρ2 of 10 degrees, the brightness distribution of the light emitted from the light emitting surface 2b is as shown in FIG. 26.

As clear from FIG. 26, the brightness is distributed in a range of 0 to 20 degrees about a central emitting angle ω2 of 10 degrees when the light is made incident upon the surface 2c of the light conducting member 2 at an incident angle ρ2 of 10 degrees. In addition to this, the brightness is extremely great in a direction of 10 degree and in the vicinity thereof.

It should be noted that the graphs shown in FIGS. 22, 24 and 26 show brightness of lights emitted in the directions of angle ω, ω1 and ω2, respectively, and the brightness is expressed by percentages with a maximum value of 100.

From the experimental results, it is proved that the emitting light emitted in a direction substantially perpendicular to the light incident surface 2b of the light conducting member 2 can be obtained by making the light incident upon the surface 2c of the light conducting member 2 at an incident angle ρ of about 0 degree.

The present invention (the third embodiment) is carried out based on the result of the above experiments. In order to achieve the purpose of the invention, it is arranged such that the light is made incident upon the incident edge surface 2a of the light conducting member 2, and the light, which is emitted from the fine diffusing portions 6 provided on the surface 20, is reflected to be introduced upon the surface 2c of the light conducting member 2 again at an incident angle ρ of nearly 0 degree.

Figure 27:
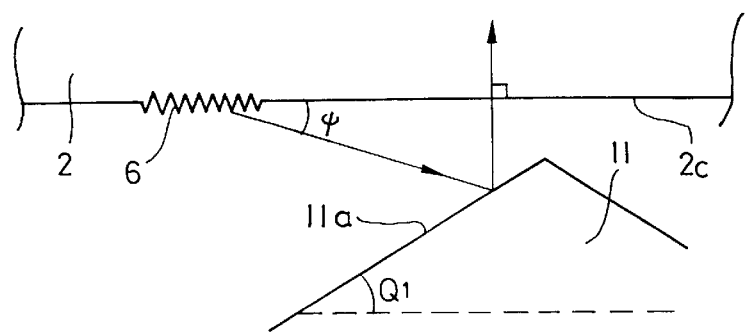
FIG. 27 is a schematic view representing a principle of the third and fourth embodiments of the present invention.

FIG. 27 shows a construction of the means for making the light, which is emitted from the surface 2c of the light conducting member 2, incident upon the surface 2c again at an incident angle ρ of 0 degree. That is to say, by arranging the inclined reflection surface 11a of the light reflecting member in the vicinity of the surface 2c of the light conducting member 2, the direction of the light reflected on the reflection surface 11a is varied. By the inclination of the reflection surface, it becomes possible to make the light incident upon the surface 2c at a substantive perpendicular direction ($\rho \fallingdotseq 0$).

From an experimental result that the light is made incident upon the light conducting member at an incident angle γ as shown in FIG. 17, almost all of the light being made incident upon the light incident edge surface 2a is emitted from the surface 2c at an emitting angle φ=60 to 80 degrees. Taking this into consideration, in order to make the light incident upon the surface 2c at a right angle after the light is emitted from the surface 2c at an emitting angle φ of 70 degrees and then is reflected by the light reflection surface 11a, the inclination angle of the reflection surface 11a may be 35 degrees. In order to arrange the reflection surface having its inclination angle of 35 degrees in the vicinity of the surface 2c, it is required that the cross section of the light conducting member in a perpendicular direction with respect to the light surface 1 has a plurality of fine triangular rods each having an inclination angle $Q_1$ of 35 degrees at least on the light incident edge surface 2a side (light source 1 side) thereof and to arrange the apical portions of the triangular rods are extended in a direction parallel to the light source 2.

The surface light source device according to the present invention has a light reflection surface which is found on the basis of the above-stated thinking. Therefore, according to the surface light source device of the present invention, the light emitted from the light source 1 is made incident upon the light incident edge surface 2a of the light conducting member 2, and then travels towards an opposite side surface 2d of the light incident edge surface 2a, being totally reflected by the surfaces except for the fine light diffusing portions 6, but the light which arrives at the fine light diffusing portion 6, is emitted from the portion at an emitting angle of φ=60 to 80 degrees as stated in the above. This emitting light is reflected by the reflection surface 11a of the light reflecting member and then made incident upon the light conducting member 2 again in a perpendicular direction or a substantially perpendicular direction, and the light is then emitted from the light conducting member in a perpendicular direction or in a substantially perpendicular direction to achieve the purpose of the present invention.

It should be noted that the surface 2c, which is an opposite side surface of the light emitting surface 2b of the light conducting member 2, can be arranged as a coarsened surface as a whole instead of forming the pattern composed of the fine diffusing portions 6. In the case that the whole surface of the opposite side of the light emitting surface is arranged as a coarsened surface, it is possible to make uniform the distribution of the light emitted from the light emitting surface, (i.e. the brightness distribution on the diffusing plate,) by varying the roughness of the coarsened surface in different positions.

According to the present invention, a bright surface light source, in which only a small amount of light is lost, can be obtained by the arrangement where the reflection surface of the light reflecting member is designed as mentioned in above and thus the light emitted from the light emitting surface of the light conducting member is directed in a direction perpendicular to the light emitting surface or in a direction near here.

Further, in the case that the opposite surface 2c of the light incident surface 2b side of the light conducting member 2 is arranged as a coarsened surface as a whole without providing a pattern of fine diffusing portions 6, some of the light being made incident upon the light conducting member 2 is emitted from almost all part of said surface. Even in this case, since the device still satisfies the above stated relations, the purpose of the present invention can be achieved.

Figure 21:
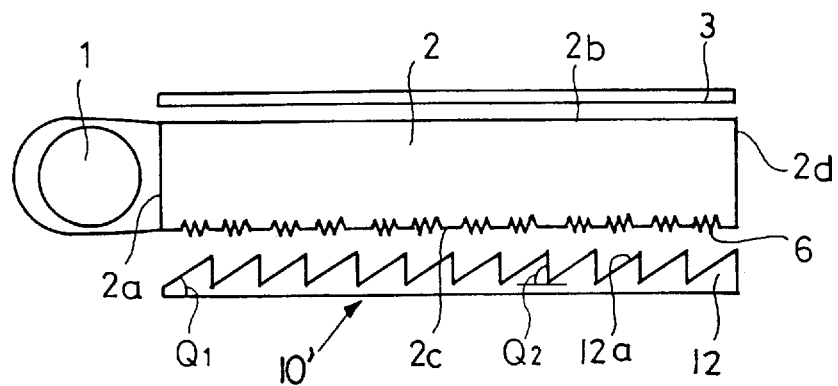
FIG. 21 is a cross-sectional view showing a surface light source device according to the fourth embodiment of the present invention.

FIG. 21 shows a construction of the fourth embodiment of the present invention. In the fourth embodiment, the shape of the reflecting member is different from that of the third embodiment. That is to say, in each triangular rod 12, the inclination angle $Q_1$ of the light reflection surface 12a is 35 degrees on the light incident edge surface 2a side of the light conducting member 2, but the other inclination angle $Q_2$ on the opposite side is not 35 degrees but, for instance, about 90 degrees.

In this embodiment, the inclination angle $Q_1$ of the light reflection surface 12a is 35 degrees, and the incident angle of the light emitted from the fine diffusing portions 6 formed on the surface 2c of the light conducting member 2 is about 70 degrees. Therefore, the light reflected by the light reflection surface 12a is made incident upon the surface 2c of the light conducting member 2 at an almost perpendicular direction thereto, and emitted from the light emitting surface 2b at the same angle as that in the second embodiment; and then the light becomes a diffusion light via the light diffusing plate 3.

It should be noted that if the inclination angle $Q_1$ of the light reflecting member 10 is not just 35 degrees in the third and fourth embodiment, there is no great difference in the effect and the function thereof.

As shown in the fourth embodiment, if the inclination angle $Q_1$, which is on the linear light source 1 side, of the surface 12a of each of the triangular rod 12 of the light reflecting member 10 is 35 degrees, the other inclination angle $Q_2$ is not limited.

Further, in the third and fourth embodiments, it may be possible to arrange the opposite side surface as a whole of the light emitting surface of the light conducting member as a coarsened surface instead of providing the pattern of fine diffusion portions on the light conducting member. The light reflecting member 10 used in the third and fourth embodiments can be manufactured in such a manner that a basic body thereof is formed by a synthetic resin and a metal having a high reflectivity, such as silver, is deposited on its light reflecting surface side. Or, it is also possible to manufacture it by pressing a metal plate.

The shape of the light conducting member used in these embodiments is not limited to a plate-like shape having a constant thickness but may be possible to use a plate where the light reflecting member side surface or the opposite surface on the light diffusion plate side is inclined.

Figure 28:
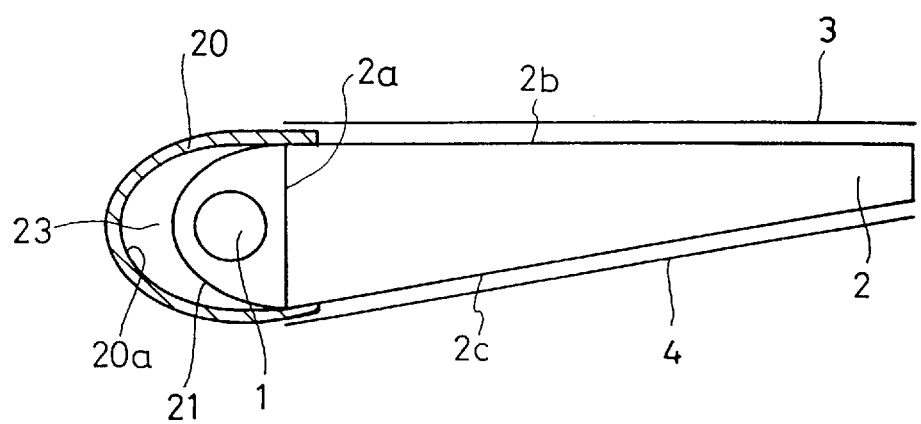
FIG. 28 is a cross-sectional view depicting a surface light source device according to the fifth embodiment of the present invention.

FIG. 28 shows a construction of the surface light source device (the fifth embodiment). The numerical reference 1 denotes a cold cathode tube, 2 a light conducting member made of a transparent material, 3 a light diffusing plate disposed on a light emitting surface 2b side of the light conducting member 2, 4 a light reflecting member provided on an opposite surface 2c side of the light emitting surface 2b of the light conducting member 2, 20 a lamp holder for covering the cold cathode tube 1, 21 a light reflecting body comprising a first light reflecting surface provided around said cold cathode tube 1, and the numerical reference 22 represents a second light reflection surface formed on the inner surface of the lamp holder 5.

In the surface light source device shown in FIG. 28, the light reflecting member 21 is arranged as a sheet made of a thin white synthetic resin, whose thickness is about 0.1 mm. The material thereof is, for instance, a poly-ethylene-terephthalate in which a substance for making the light reflectivity high is mixed. The sheet constitutes the white first light reflection surface. While, the lamp holder 20 is made of a white synthetic resin, or a press material whose main composition is poly carbonate, in which Titanium oxide is mixed in order to make the light reflectivity high. The inner surface 20a of the holder constitutes the white second light reflection surface.

It should be noted that an air space 23 is disposed between the first light reflecting surface and the second light reflecting surface.

In this embodiment, the first light reflection surface is consists of a white thin sheet made of a synthetic resin and the second light reflection surface, i.e. an inner surface of the lamp holder, is made of the white synthetic resin or the pressing material whose main composition is poly carbonate in which Titanium oxide is mixed. No metal is used for either of the light reflection surfaces. Therefore, there is no leakage of electric current generated, so that it can be prevented that the brightness of the cold cathode tube 2 is decreased.

The light emitted from the cathode cold tube 1 is reflected by the first reflection surface of the light reflecting body and then made incident upon the light incident edge surface 2a of the light conducting member in an effective manner. A part of the light which transmits through the first light reflecting surface is reflected again by the second light reflection surface and then made incident upon the light incident edge surface 2a of the light conducting member 2. Therefore, almost all of the light emitted from the cold cathode tube 1 is effectively used by the reflections on the first and second reflection surfaces. The amount of light which transmits through the second reflection surface after being transmitted through the first reflection surface becomes very small. That is to say, the amount of light, which is not used as a light source, is very small. In other words, almost all of the light is used as a light source except for only a little amount of the light which transmits through both the first and second light reflection surfaces.

In the surface light source device according to this embodiment, the light emitted from the cold cathode tube can be used in a highly effective manner because no electric current leaks from the light source.

The surface, which is found on the light reflecting member 4 side of the light conducting member 2 shown in FIG. 28, is arranged as a inclined surface, but it may be possible to arrange it as a plane surface being parallel with the light emitting surface thereof. Or, the inclination angle of the inclined surface may be smaller than that as shown in this figure.

Figure 29:
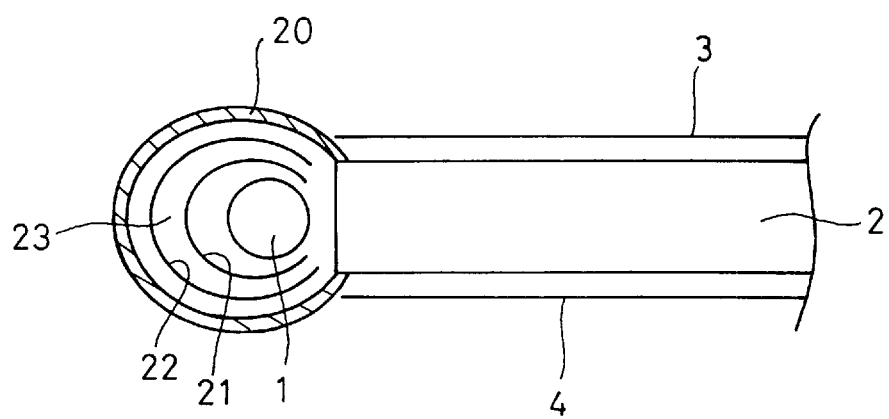
FIG. 29 is a cross-sectional view showing a surface light source device according to the sixth embodiment of the present invention.

FIG. 29 shows a construction of a part in the vicinity of the cold cathode tube used in the surface light source device according to the sixth embodiment of the present invention. The arrangement of the light conducting member 2, the light diffusing member 3, a light reflecting member 4, etc. are substantially the same as those shown in FIG. 28. However, in this embodiment, two white sheets 21 and 22 are provided in the inner space of the lamp holder 20 with an air space layer 23 therebetween, and these sheets constitute the first and second light reflection surfaces, respectively.

In this embodiment, since no metal is used for any light reflecting sheets (the first and second reflection surfaces), the brightness of the light emitted from the cold cathode tube becomes high and the light can be effectively used by the existence of such light reflecting surfaces. Therefore, a bright surface light source device can be obtained.

As the pressing material having a main composition of poly carbonate, Yupiron HR3000NR (commercial name) manufactured by Mitsubishi Gas Chemical Co., Ltd. can be suitably used. The molded product made of this material has a high reflectivity of 90% or more.

It is possible to form the white sheet by using a pressing material having a main composition of poly carbonate. Therefore, the sheet of the first reflection surface in the first embodiment or both the sheets of the first and second reflection surfaces in the second embodiment may be possible to be made of this material. In this case, the reflectivity of the white sheet(s) also becomes high, i.e. 90% or more.

Further, the sheets or molding product made of a polyethylene-terephthalate, in which a material for making the reflectivity high is mixed, have also a high reflectivity, i.e. 90% or more.

According to the fifth and sixth embodiments, a bright surface light source device can be obtained as is apparent from a comparison with the other surface light source devices mentioned in below.

(Comparative Examples) A. Surface light source device where only one sheet, which is made of synthetic resin, having a light reflectivity of 90% or more is provided as a light reflecting member covering a cold cathode tube therein.

B. Surface light source device where one sheet, which is made of synthetic resin, having a light reflectivity of 90% or more is provided as a light reflecting member covering the cold cathode tube, and a lamp holder is provided so as to cover the sheet, but the inner side of the lamp holder is not arranged as a light reflection surface.

C. Surface light source device where a cold cathode tube is covered with a lamp holder made of a molding material for use in the light reflecting member having its reflectivity of 90% or more.

D. The surface light source device according to the fifth embodiment of the present invention.

It should be noted that the devices A to D have the same construction except for the reflecting member; and the experiments were carried out under the same conditions, such as a condition for illuminating the cold cathode tube, etc. Under such circumference, meaning brightness on the light emitting surfaces of those light conducting members are as follows.

| Type of surface light source device | Meaning brightness |
|---|---|
| A | 2250(nt) |
| B | 2250(nt) |
| C | 2300(nt) |
| D | 2400(nt) |

As is clear from the above table, the surface light source device according to the fifth embodiment of the present invention is much brighter than the others. The brightness in the surface light source device according to the sixth embodiment of the present invention is almost the same as that of the fifth embodiment, which is brighter than the other devices A to C.

Figure 30:
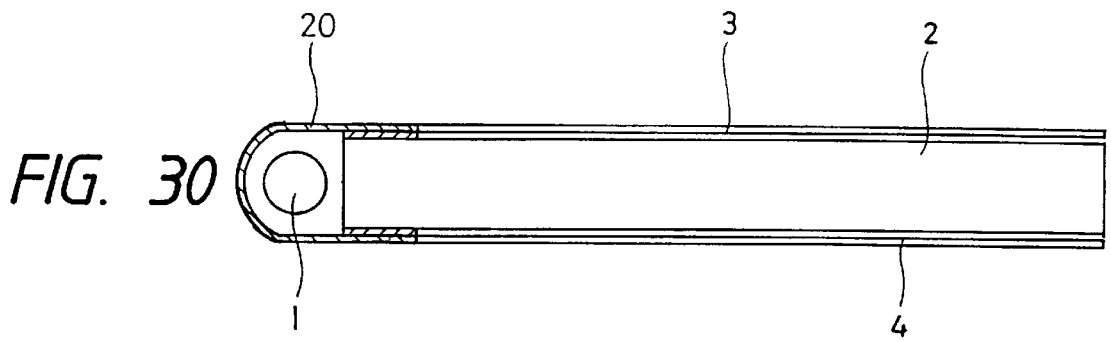
FIG. 30 is a cross-sectional view illustrating a surface light source device according to the seventh embodiment of the present invention.
Figure 31:
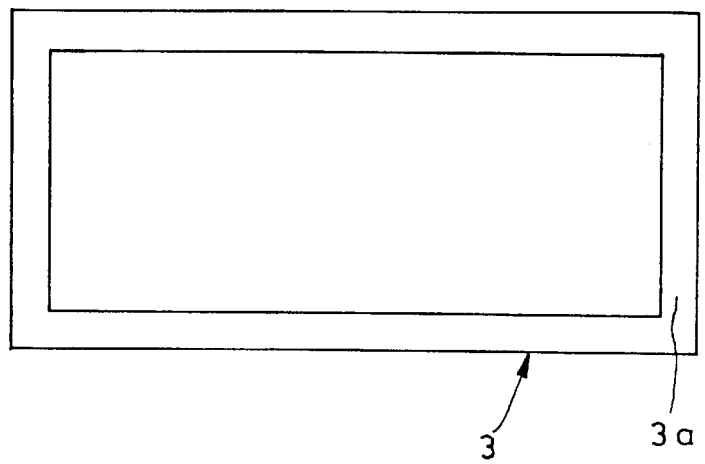
FIG. 31 is a plan view representing the surface light source device illustrated in FIG. 30.

FIGS. 30 and 31 show a construction of a surface light source device according to the seventh embodiment of the present invention; FIG. 30 is a cross-sectional view thereof. The numerical reference 1 denotes a linear light source such as a cold cathode tube, 2 a light conducting member, 3 a light diffusing member, 4 a light reflecting member and the numerical reference 20 represents a lamp holder; and the light diffusing plate 3, the light reflecting member 4, and the lamp holder 20 are fixed to the peripheral portion of the light conducting member. Further, on a peripheral portion 3a of the light diffusing plate 3 is applied a paint having a constant light absorbing ratio, as shown in FIG. 31. It is preferred that the paint has a light reflectivity of 40% to 60%, much more preferably 45% to 55%.

According to the seventh embodiment, since the light is not diffused and reflected at the peripheral portion of the light diffusing member 3 where the paint (light absorption thin layer) is applied, an unevenness of brightness, which is a problem of the conventional device, can be prevented. If the light reflectivity of the light absorption thin layer is less than 40%, in other words, if the light absorption ratio is too high, some of the light emitted from the light emitting surface is absorbed thereby, so that the whole amount of the light emitted from the light emitting surface would be decreased.

For instance, when a paint having its light reflectivity of 14% is used, the whole amount of the light emitted from the light emitting surface was decreased by about 20%. Furthermore, if the light reflectivity is 45% or less, the amount of the emitting light would also be decreased to some degree. Therefore, it is desired to arrange a paint having a reflectivity of 45% or more on the peripheral portion.

Figure 32:
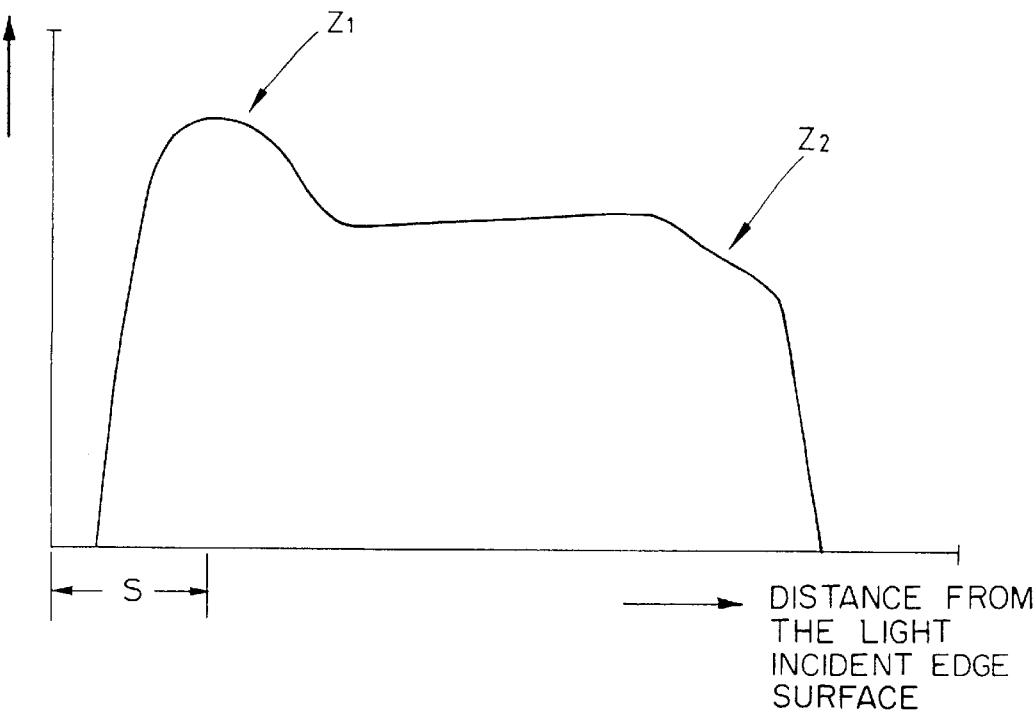
FIG. 32 is a schematic view depicting a brightness distribution on the light emitting surface in the conventional surface light sources shown in FIGS. 5 and 6.

Contrary to this, if the reflectivity of the paint exceeds 60%, the brightness becomes higher (shown by the arrow Z1 in FIG. 32) in the vicinity of the light shielded portion (the range shown by S in FIG. 32). In FIG. 32, the brightness distribution is typically shown. On the other hand, the brightness becomes lower at the portion (the range shown by Z2 in FIG. 32) which is farther from the shielded portion. This tendency appears a little when the reflectivity of the paint exceeds over 55%. Therefore, it is desirable that the reflectivity of the paint does not exceed 55%.

As stated above, it is preferred to select the reflectivity of the paint from a range of 40% to 60%, more preferably 45% to 55%.

Further, it is desirable that the reflectivity (spectral reflectance) of the light absorption thin layer provided in the peripheral portion 3a of the light diffusing member 3 is as flat as much as possible. Particularly, it is desired to make the reflectance for the red color light (wavelength of 700 nm), blue color light (wavelength of 435 nm) and green color light (wavelength of 546 nm) as much the same as possible. If the difference in reflectance among these colors is great, the emitting light would be colored, which is not preferred. The emitting light would be colored when the difference in reflectance among the three kinds of wavelengths becomes 2% or more. Therefore, it is required that the difference is 2% or less. In the above embodiment, the light is shielded by applying the paint on the light diffusing member 3, but it may be possible to get the shielding effect by printing with the aid of a paint or sticking some viscous material on the member.

Figure 34:
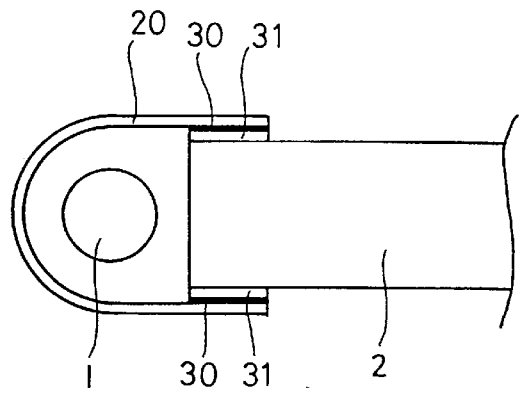
FIG. 34 is a cross-sectional view illustrating a part where the lamp holder should be arranged in the eight embodiment of the surface light source device according to the present invention.
Figure 33:
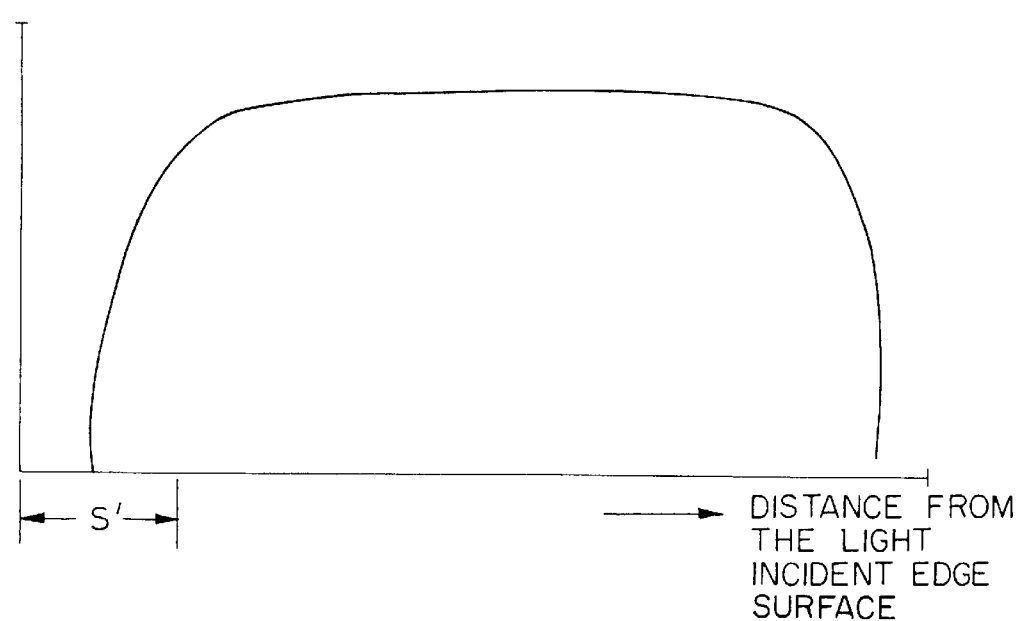
FIG. 33 is a schematic view showing a brightness distribution on the light emitting surface of the surface light source device shown in FIG. 30.

By such a light shielding treatment, it becomes possible to realize a uniform brightness distribution in the vicinity of the light shielded portion (the area S' in FIG. 33) as typically shown in FIG. 33. (For instance, the light shielding treatment can be realized by forming the fine coarsened portion, printing a pattern, or providing coarsened portion whose shapes gradually varies, on the light reflective member surface side of the light conducting member 2.) FIG. 34 shows an eighth embodiment according to the present invention, where the light diffusing member 3, etc. is fixed onto the peripheral portion (fixing portion) of the light emitting surface of the light conducting member 2 after providing a transparent thin layer 31 having a lower refractive index than that of the light conducting member 2 thereto.

In the eighth embodiment, the transparent thin layer which has a refractive index lower than that of the light conducting member is provided on the peripheral portion of the light conducting member. Therefore, almost all of the light being made incident upon the light conducting member is totally reflected by the existence of the border surface of the light conducting member 2 and the transparent layer 31. In this embodiment, since the transparent thin layer 31 is provided between the double sided tape or a bonding agent, (which is used for connecting the lamp holder 20, the light diffusing member 3 and the light reflecting member 4 to the light conducting member,) and the light conducting member 2, only a small amount of light would reach to the tape or agent. Therefore, the surface light source is not influenced by the tape or agent (influence of light diffusion or reflection) so that a uniform surface light source can be obtained. In addition to this, the light reflected by the transparent thin layer 31 can be used effectively.

An acrylic material (refractive index: 1.492) can be used for the light conducting member 2; and a transparent fluoride resin such as Cytop (refractive index: 1.34) manufactured by Asahi Glass Co., Ltd. can be suitably used for the transparent thin layer 31 in this embodiment.

Further, it may be possible to form the transparent thin layer 31 on the surface of the light conducting member 2 by socalled double molding method.

Figure 5:
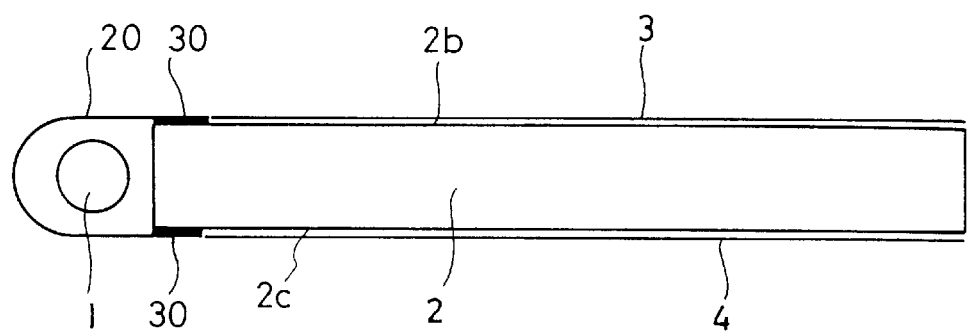
FIGS. 5 and 6 are schematic views depicting a connecting means for connecting a lamp holder to a light conducting member.
Figure 6:
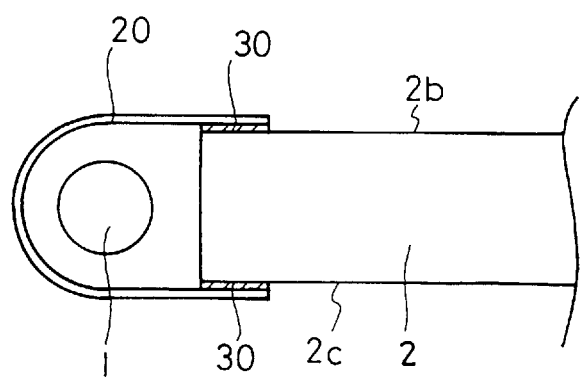
Figure 7:
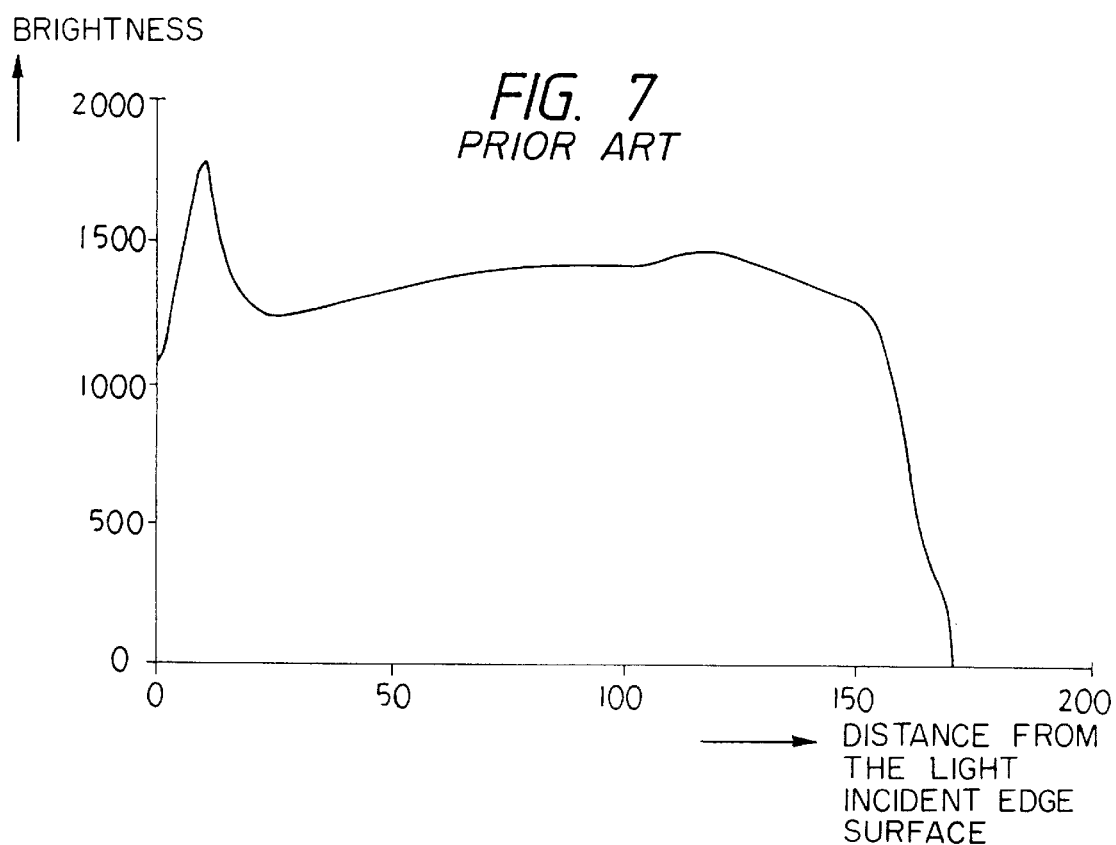
FIG. 7 is a graph showing a brightness distribution on the light emitting surface of the conventional surface light source device shown in FIGS. 5 and 6.

Furthermore, it may be possible to combine the constructions of the seventh embodiment and the eighth embodiment. That is to say, the light diffusing member shown in FIG. 30, on the peripheral portion of which a light shielding treatment is applied by means of a material having its reflectivity of 40% to 60%, more preferably 45% to 55%, can be combined with the surface light source device having its construction as shown in FIG. 5. In such a surface light source device, the light can be utilized in an effective manner with a uniform brightness distribution as in the eighth embodiment, and even in the vicinity of the connecting portion the brightness becomes uniform by using the light reflecting member shown in FIG. 5. Thus, much more preferred brightness distribution can be obtained without decreasing the efficiency of the light used.

In this case, it is also desired to select the material for the light diffusing member, in which the difference in the light reflectivity among red, blue and green colors is 2% or less, thereby the problem of colored can be prevented.

In the surface light source device according to the present invention, the light shielding means is provided on a part of light diffusing member where the brightness distribution becomes extremely high due to the attachment of the lamp holder. Therefore, the influence from the high brightness distribution can be removed. Further, the light shielding portion formed on the light diffusing member is made of a material having a predetermined light reflectance, so that the light is reflected by the light shielding portion and the reflected light can be used effectively as the surface light source. Thus, in the surface light source device of the present invention, the using efficiency of the light is improved.

It is desired to select the material having a flat spectral reflectance characteristic for the light diffusing member in the surface light source device according to the present invention. It is further preferred to select the material where the difference in the reflectance for the red (wavelength of 700 nm), blue (wavelength of 435 nm) and green (wavelength of 546 nm) colors is 2% or less.

The surface light source device according to the present invention has the other construction which comprises a light conducting member, a linear light source, a light diffusing member, a light reflecting member, and a lamp holder; also a connecting portion is provided in the vicinity of the edge surface on the light source side of the light conducting member for connecting the light diffusion member or the light reflection member, or the holder with the member; and further, the connecting portion provided on the light conducting member is connected with the lamp holder, etc. via a transparent thin layer having its refractive index lower than that of the light conducting member.

In this surface light source device, since the thin layer having its refractive index lower than that of the light conducting member is arranged on the portion where the incident light is unnecessarily diffused and reflected and thus the unevenness of the brightness distribution is caused, almost all of the incident light is totally reflected by this portion, so that no unevenness of the brightness is caused.

In case that the thin layer having such a lower refractive index on the connecting portion as stated in the above, it is preferred to provide the light shielding treatment in the vicinity of the connecting portion on the light diffusing member with the aid of the light shielding material having a suitable reflectance.

We claim:

1. A surface light source device comprising a light conducting member made of a transparent material, a light source disposed on a light incident edge surface of said light conducting member, a light diffusing member disposed on a light emitting surface side of said light conducting member, a light reflecting member disposed on an opposite surface side of said light emitting surface side of the light conducting member, a pattern having a light diffusion characteristic formed on a light reflecting member surface side of said light conducting member, and a prismatic sheet having a multiplicity of fine prismatic surfaces disposed on said light diffusing member; and wherein said pattern includes half-transparent ink in which fine spherical silicon grains each having a particle diameter of 1 to 10 micrometers are mixed.

2. A surface light source device according to claim 1, wherein:

an amount of said spherical silicon grains mixed in the transparent ink is 20% to 80% in weight; and an apical angle of each prismatic surface of said prismatic sheet is in a range of 80 to 100 degrees.

3. A surface light source device according to claim 1 or 2, wherein:

said amount of said spherical silicon grains mixed in the transparent ink is 20% in weight.

4. A surface light source device according to claim 3, wherein:

said prismatic sheet is made of poly carbonate having a refractive index of 1.585.

5. A surface light source device according to one of claims 1, or 2, wherein:

said prismatic sheet is made of poly carbonate having a refractive index of 1.585.

6. A surface light source device comprising a light conducting member having a coarsened portion on a rear surface thereof, a light source provided in the vicinity of a light incident edge surface of said light conducting member, a light diffusing member disposed on a light emitting surface side of said light conducting member, and a light reflecting member disposed on said rear surface side of said light conducting member; and wherein a value of ΔH/P of unevenness of said coarsened portion is in the following range:

$0.1 < \Delta H/P < 0.4$ wherein the reference ΔH represents a mean depth of said unevenness of the coarsened portion formed on said light conducting member, and the reference P represents a mean pitch of the unevenness.

7. A surface light source device according to claim 6, wherein:

the value of ΔH is in the following range:
$4.0 \mu m < \Delta H < 10 \mu m$.

8. A surface light source device according to claim 6 or 7, wherein:

said meaning pitch P is in the following range mentioned below:
$25 \mu m < P < 100 \mu m$.

9. A surface light source device according to claim 8, wherein:

said rear surface of the light conducting member is inclined so as to be thicker on the light source side of said light conducting member and thinner on the other side; and an inclined angle of said rear surface is in a range of 0 to 4 degrees.

10. A surface light source device according to one of claims 6 or 7, wherein:

said rear surface of the light conducting member is inclined so as to be thicker on the light source side of said light conducting member and thinner on the other side; and an inclined angle of said rear surface is in a range of 0 to 4 degrees.

11. A surface light source device according to claim 1 or 6, wherein:

a cross-section of a light reflecting surface of said light reflecting member has its shape in that a multiplicity of triangles are continued; and an inclined angle on a light source side of the triangle is about 35 degrees.

12. A surface light source device comprising a light conducting member made of a transparent material, a linear light source constituted of a cold cathode tube arranged on a light incident edge surface of said light conducting member; a light diffusing member disposed on a light emitting surface side of said light conducting member; a light reflecting member arranged on an opposite surface of said light incident surface of the light conducting member; a pattern having a light diffusing charactertic formed on a surface on a light reflecting member side of the light conducting member; and a light reflecting body being arranged so as to cover said cold cathode tube:

wherein said light reflecting body has a double construction having two light reflecting surfaces between which an airspace is provided; and a first light reflecting surface thereof, which is arranged on a cold cathode tube side, is made of a thin white synthetic resin sheet and a second light reflecting surface thereof, which is disposed in a position farther from the cold cathode tube, is arranged as a white light reflecting surface.

13. A surface light source device according to claim 12, wherein:

said device further comprises a lamp holder for holding said cold cathode tube; inside of the lamp holder is made of white synthetic resin, and an inside surface of said lamp holder is arranged as said second reflective surface which is arranged so as to be farther from the cold cathode tube.

14. A surface light source device according to claim 13, wherein:

said first reflecting surface is made of a poly-ethylene-terephthalate into which a material having a high reflectivity is mixed; and said second light reflecting surface is made of a synthetic resin mainly consisting of a poly-carbonate into which Titanium oxide is mixed.

15. A surface light source device comprising a light conducting member made of a transparent material; a light source disposed on a light incident edge surface of said light conducting member; a light diffusion member disposed on a light emitting surface side of the light conducting member; a light reflecting member provided on an opposite surface of a light emitting surface of said light conducting member; a pattern having a light diffusing characteristic formed on a surface on a light reflecting member side of said light conducting member; and a lamp holder covering said light source;

wherein both edges of said lamp holder or either of said light diffusing member or said light reflecting member is contacted with the light conducting member in the vicinity of an edge surface on the light source side thereof by means of a bonding member; and wherein a light shielding treatment is applied at least in the vicinity of a peripheral portion on a light source guide of a light source side of said light diffusing member with the aid of a material having a reflectance selected from a range of 40 to 60%.

16. A surface light source device according to claim 15, wherein:

a transparent portion having a light reflectivity lower than that of the light conducting member is formed on the surface of said light conducting member, and said connection by means of a bonding member, is conducted on said transparent portion having a lower refractive index than that of the light conducting member.

17. A surface light source device according to claim 15 or 16, wherein:

said material used for the light shielding treatment is a paint where the difference in the light reflectance of the red, blue and green lights is 2% or less.

18. A surface light source device comprising a light conducting member made of a transparent material; a light source disposed on a light incident edge surface of the light conducting member; a light diffusing member provided on a light emitting surface side of said light conducting member; a light reflecting member arranged on an opposite side of said light emitting surface of said light conducting member; a pattern having a light diffusing characteristic formed on the light reflecting member side of said light conducting member; and a lamp holder for covering said light source;

wherein both edges of said lamp holder or either of said light diffusing member or said light reflecting member is contacted with the light conducting member in the vicinity of an edge surface on the light source side thereof by means of a bonding member; and said contact is conducted via a transparent thin layer, which is provided between said light conducting member and said bonding member having refractive index lower than that of said light conducting member.

* * * * *